(12) United States Patent
Pickles et al.

(10) Patent No.: US 12,405,974 B2
(45) Date of Patent: Sep. 2, 2025

(54) GEOLOGIC SEARCH FRAMEWORK

(71) Applicant: Schlumberger Technology Corporation, Sugar Land, TX (US)

(72) Inventors: Robin John Pickles, Abingdon (GB); Richard Torrens, Abingdon (GB); Stephen Robert Freeman, Leeds (GB); Ranjit Vhanamane, Abingdon (GB); Kwangwon Park, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/263,274

(22) PCT Filed: Jan. 31, 2022

(86) PCT No.: PCT/US2022/070428
§ 371 (c)(1),
(2) Date: Jul. 27, 2023

(87) PCT Pub. No.: WO2022/165528
PCT Pub. Date: Aug. 4, 2022

(65) Prior Publication Data
US 2024/0086430 A1    Mar. 14, 2024

Related U.S. Application Data

(60) Provisional application No. 63/143,906, filed on Jan. 31, 2021.

(51) Int. Cl.
*G06F 16/29* (2019.01)
*G06F 16/2457* (2019.01)
(Continued)

(52) U.S. Cl.
CPC ........ *G06F 16/29* (2019.01); *G06F 16/24578* (2019.01); *G06F 16/248* (2019.01); *G06N 20/00* (2019.01)

(58) Field of Classification Search
CPC .. G06F 16/29; G06F 16/24578; G06F 16/248; G01V 1/01; G01V 1/226;
(Continued)

(56) References Cited

U.S. PATENT DOCUMENTS

| | | |
|---|---|---|
| 10,767,476 B2 | 9/2020 | Knight et al. |
| 2014/0279772 A1 | 9/2014 | Pennewitz et al. |

(Continued)

FOREIGN PATENT DOCUMENTS

| | | |
|---|---|---|
| WO | 2017188858 A1 | 11/2017 |
| WO | 2020257263 | 12/2020 |
| WO | 2021010943 A1 | 1/2021 |

OTHER PUBLICATIONS

PCT International Search Report and Written Opinion; Application No. PCT/US2022/070428; Dated May 10, 2022; 12 pages.
(Continued)

*Primary Examiner* — Jared M Bibbee
(74) *Attorney, Agent, or Firm* — Jeffrey D. Frantz

(57) ABSTRACT

A method can include, responsive to receipt of input characterizing a geologic environment, utilizing a trained machine learning model to identify a number of geologic environments that include corresponding data stored in at least one database; analyzing one or more of the number of geologic environments; and outputting a result based at least in part on the analyzing.

20 Claims, 17 Drawing Sheets

(51) Int. Cl.
*G06F 16/248* (2019.01)
*G06N 20/00* (2019.01)

(58) Field of Classification Search
CPC ........ G06N 20/00; G06N 3/045; G06N 3/088; G06N 7/01
See application file for complete search history.

(56) References Cited

U.S. PATENT DOCUMENTS

| | | |
|---|---|---|
| 2021/0017847 A1 | 1/2021 | Aragall et al. |
| 2021/0317726 A1* | 10/2021 | Tawil ..................... G06F 30/13 |
| 2021/0318464 A1* | 10/2021 | Tawil ..................... E21B 44/00 |
| 2022/0114302 A1* | 4/2022 | Skripkin ................ G06N 20/20 |
| 2024/0077642 A1* | 3/2024 | Fuchey ............... G06F 16/9038 |

OTHER PUBLICATIONS

Extended Search Report issued in European Patent Application No. 22746926.9 dated Nov. 13, 2024, 7 pages.

* cited by examiner

System 600
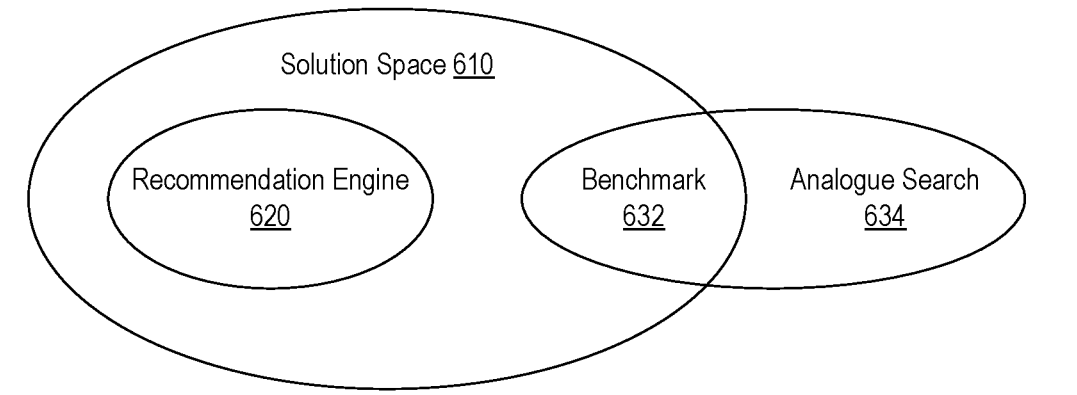
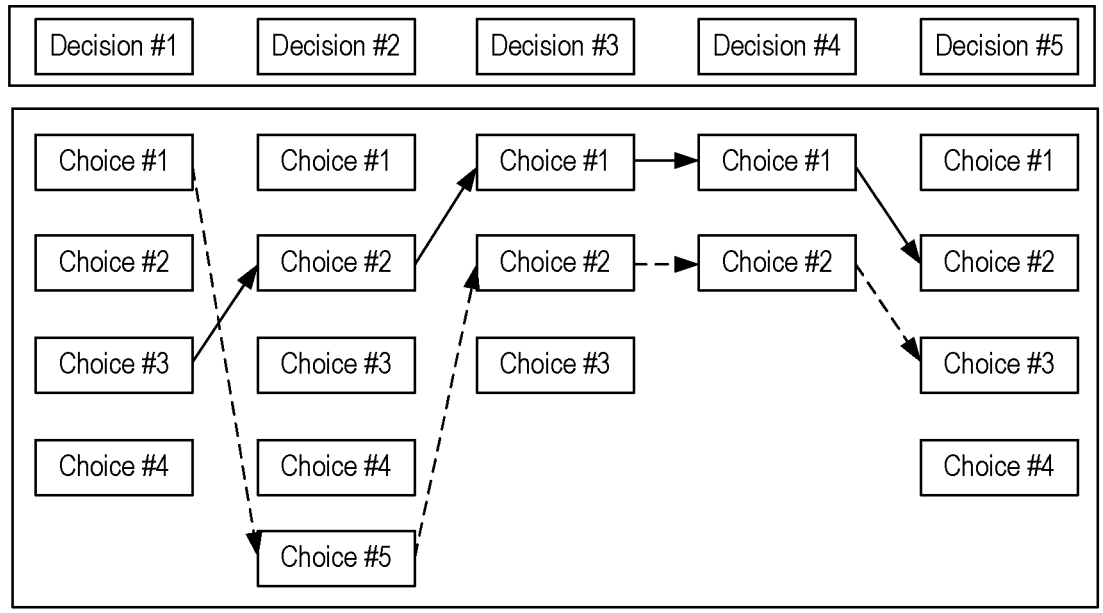
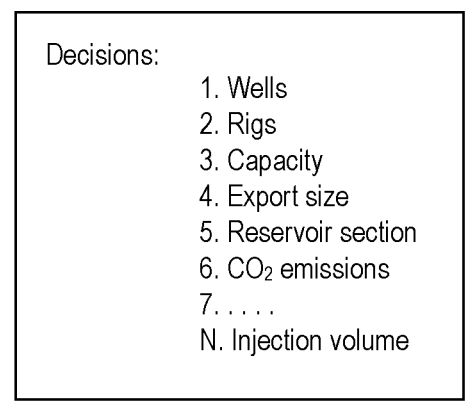
Fig. 6

GUI 700

A: 10 Wells + 1 Rig 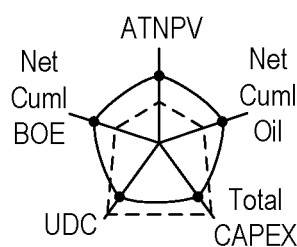   B: 10 Wells + 3 Rigs 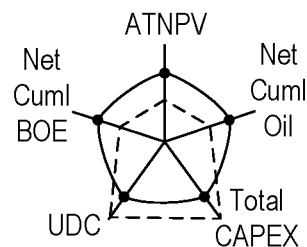

C: 20 Wells + 2 Rigs 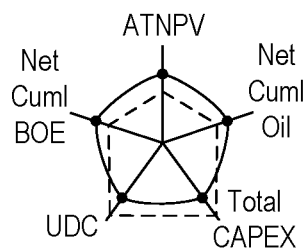   D: 50 Wells + 1 Rig 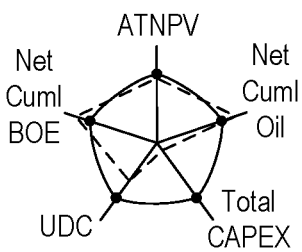   E: 50 Wells + 3 Rigs 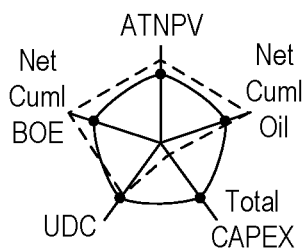

Sparse Space

Number of wells and number of rigs are chosen as decisions
Number of wells range from 10-50 (41 options) and number of rigs vary from 1-3 (3 options)
Performance metrics: ATNPV, Net Cuml Oil, Total CAPEX, UDC, Net Cuml BOE
123 possible scenarios w.r.t. number of wells and number of rigs
Scenarios input by use initially for scenario recommendation engine

Fig. 7

Train Autoencoder 1310
(e.g., learn representations)
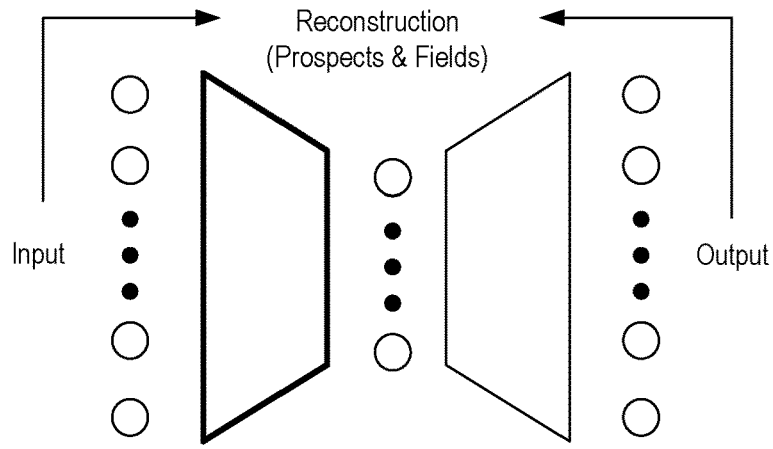
Reconstruction
(Prospects & Fields)
Input ... Output
Prediction 1320
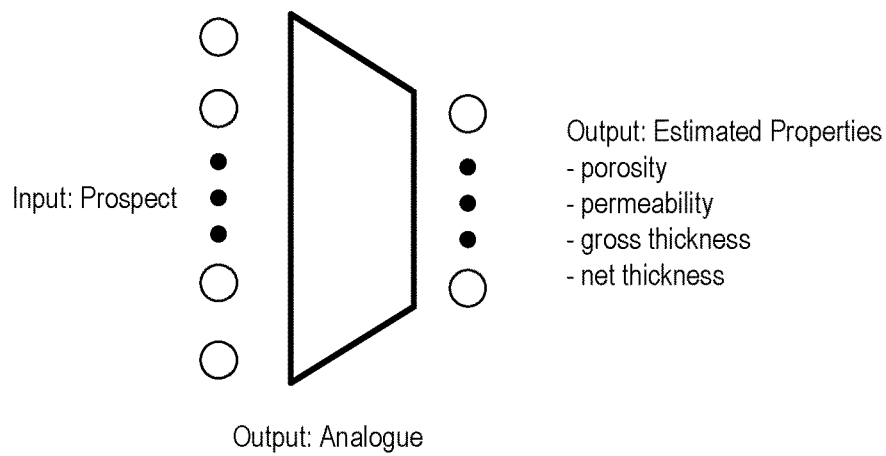
Input: Prospect
Output: Estimated Properties
- porosity
- permeability
- gross thickness
- net thickness
Output: Analogue
Ranking of Fields using Similarity
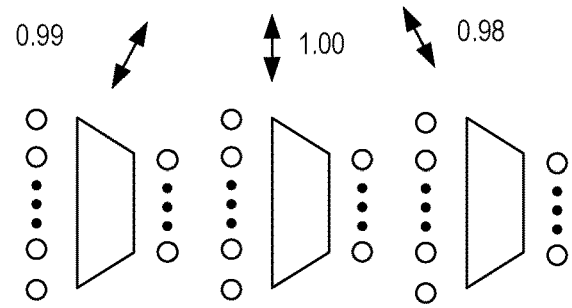
0.99   1.00   0.98
Fig. 13

1400

1500

Responsive to receipt of input characterizing a geologic environment, utilize a trained machine learning model to identify a number of geologic environments that include corresponding data stored in at least one database
1510

CRM 1511

Analyze one or more of the number of geologic environments
1520

CRM 1521

Output a result based at least in part on the analysis
1530

CRM 1531

Fig. 15

GEOLOGIC SEARCH FRAMEWORK

RELATED APPLICATIONS

This application is a National Stage Entry of International Application No. PCT/US2022/070428, filed 31 Jan. 2022, which claims priority to and the benefit of a U.S. Provisional Application having Ser. No. 63/143,906, filed 31 Jan. 2021, which is incorporated by reference herein.

BACKGROUND

A reservoir can be a subsurface formation that can be characterized at least in part by its porosity and fluid permeability. As an example, a reservoir may be part of a basin such as a sedimentary basin. A basin can be a depression (e.g., caused by plate tectonic activity, subsidence, etc.) in which sediments accumulate. As an example, where hydrocarbon source rocks occur in combination with appropriate depth and duration of burial, a petroleum system may develop within a basin, which may form a reservoir that includes hydrocarbon fluids (e.g., oil, gas, etc.).

An analogue can be an example of an exposed structure that is used for comparison to a subsurface structure (e.g., not exposed at the surface of the Earth). In oil and gas exploration, geoscientists and engineers may compare subterranean structures with surface exposures deemed analogs where they may be thought to be similar in depositional environment and reservoir character to the subterranean structures. Such comparisons may be part of an interpretation process and based on direct visual comparisons of surface imagery to a stratigraphic model (e.g., a layer cake type of model, etc.) of a subterranean region. For example, layers seen in a surface image of an outcrop rendered to a display may be visually compared to layers seen in a stratigraphic model rendered to a display. An outcrop can be a body of rock exposed at the surface of the Earth, which may be exposed naturally or due to one or more human actions (e.g., construction of a highway, construction of a railroad, open pit mining, etc.).

In oil and gas exploration, interpretation is a process that involves analysis of data to identify and locate various subsurface structures (e.g., horizons, faults, geobodies, etc.) in a geologic environment. Various types of structures (e.g., stratigraphic formations) may be indicative of hydrocarbon traps or flow channels, as may be associated with one or more reservoirs (e.g., fluid reservoirs). In the field of resource extraction, enhancements to interpretation can allow for construction of a more accurate model of a subsurface region, which, in turn, may improve characterization of the subsurface region for purposes of resource extraction. Characterization of one or more subsurface regions in a geologic environment can guide, for example, performance of one or more operations (e.g., field operations, etc.). As an example, a more accurate model of a subsurface region may make a drilling operation more accurate as to a borehole's trajectory where the borehole is to have a trajectory that penetrates a reservoir, etc.

SUMMARY

A method can include, responsive to receipt of input characterizing a geologic environment, utilizing a trained machine learning model to identify a number of geologic environments that include corresponding data stored in at least one database; analyzing one or more of the number of geologic environments; and outputting a result based at least in part on the analyzing. A system can include one or more processors; memory accessible to at least one of the one or more processors; processor-executable instructions stored in the memory and executable to instruct the system to: responsive to receipt of input characterizing a geologic environment, utilize a trained machine learning model to identify a number of geologic environments that include corresponding data stored in at least one database; perform an analysis of one or more of the number of geologic environments; and output a result based at least in part on the analysis. One or more computer-readable storage media can include processor-executable instructions to instruct a computing system to: responsive to receipt of input characterizing a geologic environment, utilize a trained machine learning model to identify a number of geologic environments that include corresponding data stored in at least one database; perform an analysis of one or more of the number of geologic environments; and output a result based at least in part on the analysis. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIG. 6 illustrates an example of a system;

FIG. 7 illustrates an example of a graphical user interface;

FIG. 13 illustrates examples of techniques;

FIG. 15 illustrates an example of a method;

DETAILED DESCRIPTION

This description is not to be taken in a limiting sense, but rather is made merely for the purpose of describing the general principles of the implementations. The scope of the described implementations should be ascertained with reference to the issued claims.

Figure 1:
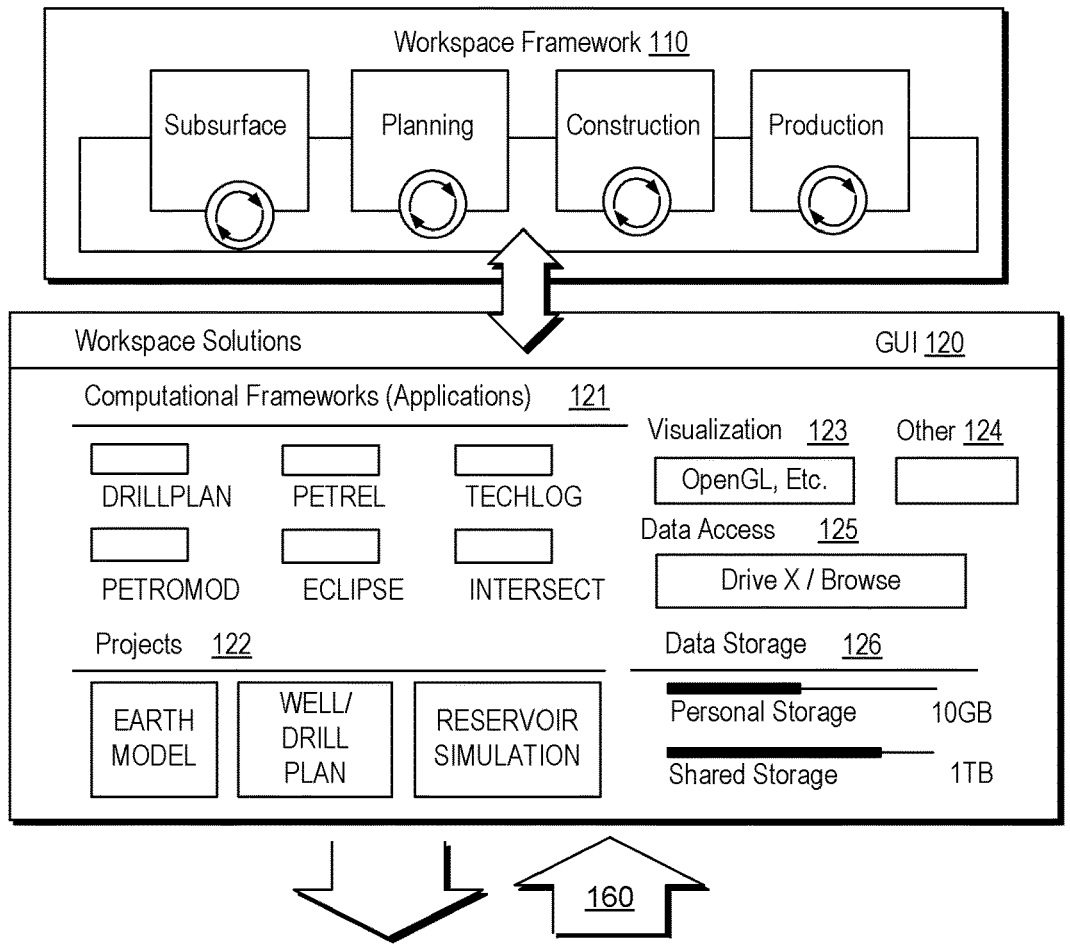
FIG. 1 illustrates an example system that includes various framework components associated with one or more geologic environments.

FIG. 1 shows an example of a system 100 that includes a workspace framework 110 that can provide for instantiation of, rendering of, interactions with, etc., a graphical user interface (GUI) 120. In the example of FIG. 1, the GUI 120 can include graphical controls for computational frameworks (e.g., applications) 121, projects 122, visualization 123, one or more other features 124, data access 125, and data storage 126.

In the example of FIG. 1, the workspace framework 110 may be tailored to a particular geologic environment such as an example geologic environment 150. For example, the geologic environment 150 may include layers (e.g., stratification) that include a reservoir 151 and that may be intersected by a fault 153. As an example, the geologic environment 150 may be outfitted with a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a wellsite and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

In the example of FIG. 1, the GUI 120 shows some examples of computational frameworks, including the DRILLPLAN, PETREL, TECHLOG, PETROMOD, ECLIPSE, and INTERSECT frameworks (Schlumberger Limited, Houston, Texas).

The DRILLPLAN framework provides for digital well construction planning and includes features for automation of repetitive tasks and validation workflows, enabling improved quality drilling programs (e.g., digital drilling plans, etc.) to be produced quickly with assured coherency.

The PETREL framework can be part of the DELFI cognitive exploration and production (E&P) environment (Schlumberger Limited, Houston, Texas, referred to as the DELFI environment) for utilization in geosciences and geoengineering, for example, to analyze subsurface data from exploration to production of fluid from a reservoir.

One or more types of frameworks may be implemented within or in a manner operatively coupled to the DELFI environment, which is a secure, cognitive, cloud-based collaborative environment that integrates data and workflows with digital technologies, such as artificial intelligence (AI) and machine learning (ML). As an example, such an environment can provide for operations that involve one or more frameworks. The DELFI environment may be referred to as the DELFI framework, which may be a framework of frameworks. As an example, the DELFI environment can include various other frameworks, which can include, for example, one or more types of models (e.g., simulation models, etc.).

The TECHLOG framework can handle and process field and laboratory data for a variety of geologic environments (e.g., deepwater exploration, shale, etc.). The TECHLOG framework can structure wellbore data for analyses, planning, etc.

The PETROMOD framework provides petroleum systems modeling capabilities that can combine one or more of seismic, well, and geological information to model the evolution of a sedimentary basin. The PETROMOD framework can predict if, and how, a reservoir has been charged with hydrocarbons, including the source and timing of hydrocarbon generation, migration routes, quantities, and hydrocarbon type in the subsurface or at surface conditions.

The ECLIPSE framework provides a reservoir simulator (e.g., as a computational framework) with numerical solutions for fast and accurate prediction of dynamic behavior for various types of reservoirs and development schemes.

The INTERSECT framework provides a high-resolution reservoir simulator for simulation of detailed geological features and quantification of uncertainties, for example, by creating accurate production scenarios and, with the integration of precise models of the surface facilities and field operations, the INTERSECT framework can produce reliable results, which may be continuously updated by real-time data exchanges (e.g., from one or more types of data acquisition equipment in the field that can acquire data during one or more types of field operations, etc.). The INTERSECT framework can provide completion configurations for complex wells where such configurations can be built in the field, can provide detailed chemical-enhanced-oil-recovery (EOR) formulations where such formulations can be implemented in the field, can analyze application of steam injection and other thermal EOR techniques for implementation in the field, advanced production controls in terms of reservoir coupling and flexible field management, and flexibility to script customized solutions for improved modeling and field management control. The INTERSECT framework, as with the other example frameworks, may be utilized as part of the DELFI environment, for example, for rapid simulation of multiple concurrent cases. For example, a workflow may utilize one or more of the DELFI on demand reservoir simulation features.

The aforementioned DELFI environment provides various features for workflows as to subsurface analysis, planning, construction and production, for example, as illustrated in the workspace framework 110. As shown in FIG. 1, outputs from the workspace framework 110 can be utilized for directing, controlling, etc., one or more processes in the geologic environment 150 and, feedback 160, can be received via one or more interfaces in one or more forms (e.g., acquired data as to operational conditions, equipment conditions, environment conditions, etc.).

As an example, a workflow may progress to a geology and geophysics ("G&G") service provider, which may generate a well trajectory, which may involve execution of one or more G&G software packages. Examples of such software packages include the PETREL framework. Such a framework may operatively couple various other frameworks to provide for a multi-framework workspace. As an example, the GUI 120 of FIG. 1 may be a GUI of the DELFI environment, etc.

In the example of FIG. 1, the visualization features 123 may be implemented via the workspace framework 110, for example, to perform tasks as associated with one or more of subsurface regions, planning operations, constructing wells and/or surface fluid networks, and producing from a reservoir.

As an example, a visualization process can implement one or more of various features that can be suitable for one or more web applications. For example, a template may involve use of the JAVASCRIPT object notation format (JSON) and/or one or more other languages/formats. As an example, a framework may include one or more converters. For example, consider a JSON to PYTHON converter and/or a PYTHON to JSON converter such that various types of code may be utilized.

As an example, visualization features can provide for visualization of various earth models, properties, etc., in one or more dimensions. As an example, visualization features can provide for rendering of information in multiple dimensions, which may optionally include multiple resolution rendering. In such an example, information being rendered may be associated with one or more frameworks and/or one or more data stores. As an example, visualization features may include one or more control features for control of equipment, which can include, for example, field equipment that can perform one or more field operations. As an example, a workflow may utilize one or more frameworks to generate information that can be utilized to control one or more types of field equipment (e.g., drilling equipment, wireline equipment, fracturing equipment, etc.).

As to a reservoir model that may be suitable for utilization by a simulator, consider acquisition of seismic data as acquired via reflection seismology, which finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz). Seismic data may be processed and interpreted, for example, to understand better composition, fluid content, extent and geometry of subsurface rocks. Such interpretation results can be utilized to plan, simulate, perform, etc., one or more operations for production of fluid from a reservoir (e.g., reservoir rock, etc.).

Field acquisition equipment may be utilized to acquire seismic data, which may be in the form of traces where a trace can include values organized with respect to time and/or depth (e.g., consider 1D, 2D, 3D or 4D seismic data). For example, consider acquisition equipment that acquires digital samples at a rate of one sample per approximately 4 ms. Given a speed of sound in a medium or media, a sample rate may be converted to an approximate distance. For example, the speed of sound in rock may be on the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sampling rate of one sample at about 4 ms intervals, such a trace would include about 1000 samples where latter acquired samples correspond to deeper reflection boundaries. If the 4 second trace duration of the foregoing example is divided by two (e.g., to account for reflection), for a vertically aligned source and sensor, a deepest boundary depth may be estimated to be about 10 km (e.g., assuming a speed of sound of about 5 km per second).

As an example, a model may be a simulated version of a geologic environment. As an example, a simulator may include features for simulating physical phenomena in a geologic environment based at least in part on a model or models. A simulator, such as a reservoir simulator, can simulate fluid flow in a geologic environment based at least in part on a model that can be generated via a framework that receives seismic data. A simulator can be a computerized system (e.g., a computing system) that can execute instructions using one or more processors to solve a system of equations that describe physical phenomena subject to various constraints. In such an example, the system of equations may be spatially defined (e.g., numerically discretized) according to a spatial model that includes layers of rock, geobodies, etc., that have corresponding positions that can be based on interpretation of seismic and/or other data. A spatial model may be a cell-based model where cells are defined by a grid (e.g., a mesh). A cell in a cell-based model can represent a physical area or volume in a geologic environment where the cell can be assigned physical properties (e.g., permeability, fluid properties, etc.) that may be germane to one or more physical phenomena (e.g., fluid volume, fluid flow, pressure, etc.). A reservoir simulation model can be a spatial model that may be cell-based.

A simulator can be utilized to simulate the exploitation of a real reservoir, for example, to examine different productions scenarios to find an optimal one before production or further production occurs. A reservoir simulator does not provide an exact replica of flow in and production from a reservoir at least in part because the description of the reservoir and the boundary conditions for the equations for flow in a porous rock are generally known with an amount of uncertainty. Certain types of physical phenomena occur at a spatial scale that can be relatively small compared to size of a field. A balance can be struck between model scale and computational resources that results in model cell sizes being of the order of meters; rather than a lesser size (e.g., a level of detail of pores). A modeling and simulation workflow for multiphase flow in porous media (e.g., reservoir rock, etc.) can include generalizing real micro-scale data from macro scale observations (e.g., seismic data and well data) and upscaling to a manageable scale and problem size. Uncertainties can exist in input data and solution procedure such that simulation results too are to some extent uncertain. A process known as history matching can involve comparing simulation results to actual field data acquired during production of fluid from a field. Information gleaned from history matching, can provide for adjustments to a model, data, etc., which can help to increase accuracy of simulation.

As an example, a simulator may utilize various types of constructs, which may be referred to as entities. Entities may include earth entities or geological objects such as wells, surfaces, reservoirs, etc. Entities can include virtual representations of actual physical entities that may be reconstructed for purposes of simulation. Entities may include entities based on data acquired via sensing, observation, etc. (e.g., consider entities based at least in part on seismic data and/or other information). As an example, an entity may be characterized by one or more properties (e.g., a geometrical pillar grid entity of an earth model may be characterized by a porosity property, etc.). Such properties may represent one or more measurements (e.g., acquired data), calculations, etc.

As an example, a simulator may utilize an object-based software framework, which may include entities based on pre-defined classes to facilitate modeling and simulation. As an example, an object class can encapsulate reusable code and associated data structures. Object classes can be used to instantiate object instances for use by a program, script, etc. For example, borehole classes may define objects for representing boreholes based on well data. A model of a basin, a reservoir, etc. may include one or more boreholes where a borehole may be, for example, for measurements, injection, production, etc. As an example, a borehole may be a wellbore of a well, which may be a completed well (e.g., for production of a resource from a reservoir, for injection of material, etc.).

While several simulators are illustrated in the example of FIG. 1, one or more other simulators may be utilized, additionally or alternatively. For example, consider the VISAGE geomechanics simulator (Schlumberger Limited, Houston Texas) or the PIPESIM network simulator (Schlumberger Limited, Houston Texas), etc. The VISAGE simulator includes finite element numerical solvers that may provide simulation results such as, for example, results as to compaction and subsidence of a geologic environment, well and completion integrity in a geologic environment, caprock and fault-seal integrity in a geologic environment, fracture behavior in a geologic environment, thermal recovery in a geologic environment, $CO_2$ disposal, etc. The PIPESIM simulator includes solvers that may provide simulation results such as, for example, multiphase flow results (e.g., from a reservoir to a wellhead and beyond, etc.), flowline and surface facility performance, etc. The PIPESIM simulator may be integrated, for example, with the AVOCET production operations framework (Schlumberger Limited, Houston Texas). As an example, a reservoir or reservoirs may be simulated with respect to one or more enhanced recovery techniques (e.g., consider a thermal process such as steam-assisted gravity drainage (SAGD), etc.). As an example, the PIPESIM simulator may be an optimizer that can optimize one or more operational scenarios at least in part via simulation of physical phenomena. The MANGROVE simulator (Schlumberger Limited, Houston, Texas) provides for optimization of stimulation design (e.g., stimulation treatment operations such as hydraulic fracturing) in a reservoir-centric environment. The MANGROVE framework can combine scientific and experimental work to predict geomechanical propagation of hydraulic fractures, reactivation of natural fractures, etc., along with production forecasts within 3D reservoir models (e.g., production from a drainage area of a reservoir where fluid moves via one or more types of fractures to a well and/or from a well). The MANGROVE framework can provide results pertaining to heterogeneous interactions between hydraulic and natural fracture networks, which may assist with optimization of the number and location of fracture treatment stages (e.g., stimulation treatment(s)), for example, to increased perforation efficiency and recovery.

The PETREL framework provides components that allow for optimization of exploration and development operations. The PETREL framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes (e.g., with respect to one or more geologic environments, etc.). Such a framework may be considered an application (e.g., executable using one or more devices) and may be considered a data-driven application (e.g., where data is input for purposes of modeling, simulating, etc.).

Figure 2:
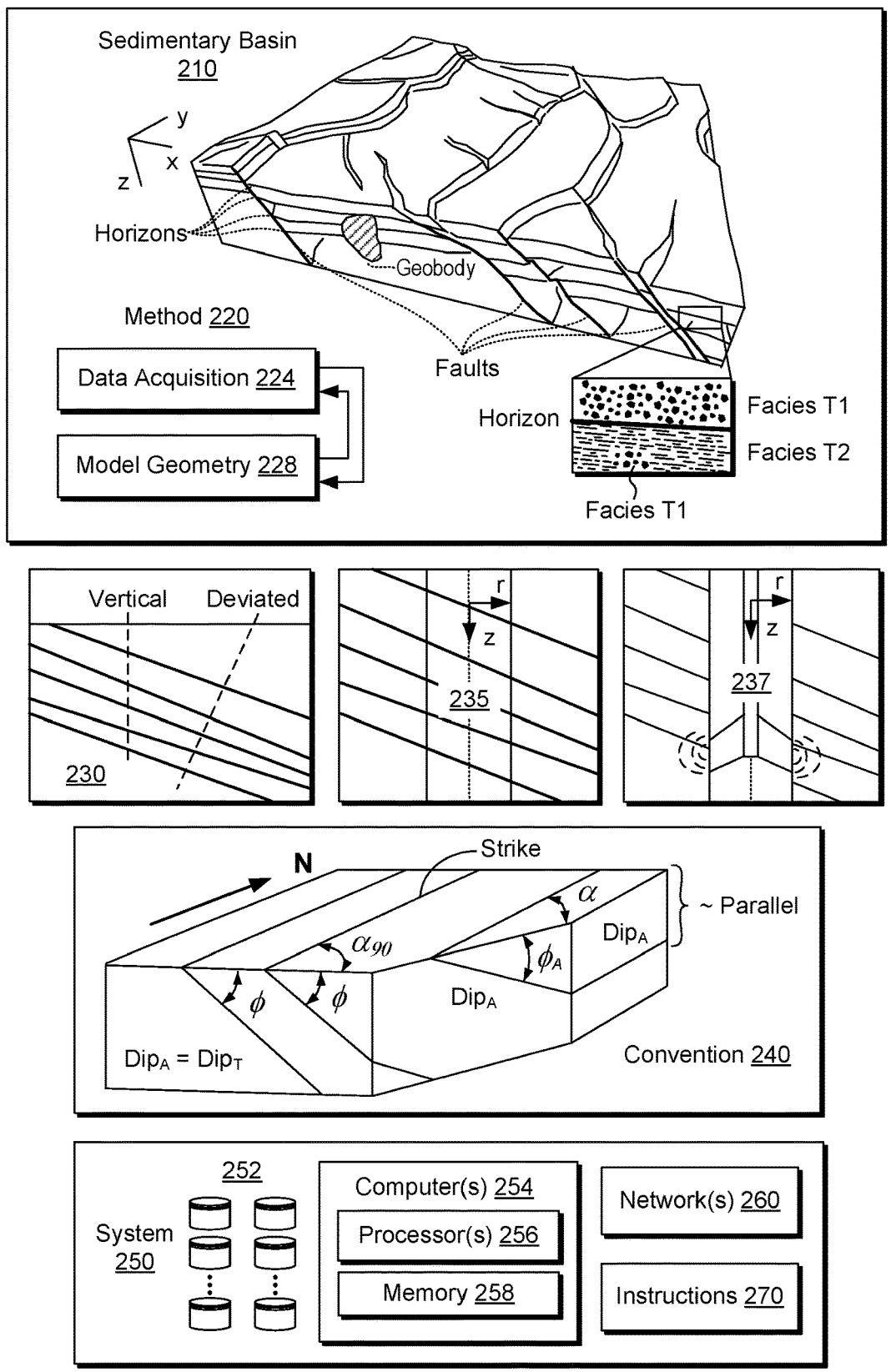
FIG. 2 illustrates examples of a basin, a convention and a system.

FIG. 2 shows an example of a sedimentary basin 210 (e.g., a geologic environment), an example of a method 220 for model building (e.g., for a simulator, etc.), an example of a formation 230, an example of a borehole 235 in a formation, an example of a convention 240 and an example of a system 250.

As an example, data acquisition, reservoir simulation, petroleum systems modeling, etc. may be applied to characterize various types of subsurface environments, including environments such as those of FIG. 1.

In FIG. 2, the sedimentary basin 210, which is a geologic environment, includes horizons, faults, one or more geobodies and facies formed over some period of geologic time. These features are distributed in two or three dimensions in space, for example, with respect to a Cartesian coordinate system (e.g., x, y and z) or other coordinate system (e.g., cylindrical, spherical, etc.). As shown, the model building method 220 includes a data acquisition block 224 and a model geometry block 228. Some data may be involved in building an initial model and, thereafter, the model may optionally be updated in response to model output, changes in time, physical phenomena, additional data, etc. As an example, data for modeling may include one or more of the following: depth or thickness maps and fault geometries and timing from seismic, remote-sensing, electromagnetic, gravity, outcrop and well log data. Furthermore, data may include depth and thickness maps stemming from facies variations (e.g., due to seismic unconformities) assumed to following geological events ("iso" times) and data may include lateral facies variations (e.g., due to lateral variation in sedimentation characteristics).

To proceed to modeling of geological processes, data may be provided, for example, data such as geochemical data (e.g., temperature, kerogen type, organic richness, etc.), timing data (e.g., from paleontology, radiometric dating, magnetic reversals, rock and fluid properties, etc.) and boundary condition data (e.g., heat-flow history, surface temperature, paleowater depth, etc.).

In basin and petroleum systems modeling, quantities such as temperature, pressure and porosity distributions within the sediments may be modeled, for example, by solving partial differential equations (PDEs) using one or more numerical techniques. Modeling may also model geometry with respect to time, for example, to account for changes stemming from geological events (e.g., deposition of material, erosion of material, shifting of material, etc.).

As shown in FIG. 2, the formation 230 includes a horizontal surface and various subsurface layers. As an example, a borehole may be vertical. As another example, a borehole may be deviated. In the example of FIG. 2, the borehole 235 may be considered a vertical borehole, for example, where the z-axis extends downwardly normal to the horizontal surface of the formation 230. As an example, a tool 237 may be positioned in a borehole, for example, to acquire information. As mentioned, a borehole tool can include one or more sensors that can acquire borehole images via one or more imaging techniques. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

As an example, data can include geochemical data. For example, consider data acquired using X-ray fluorescence (XRF) technology, Fourier transform infrared spectroscopy (FTIR) technology and/or wireline geochemical technology.

As an example, one or more probes may be deployed in a bore via a wireline or wirelines. As an example, a probe may emit energy and receive energy where such energy may be analyzed to help determine mineral composition of rock surrounding a bore. As an example, nuclear magnetic resonance may be implemented (e.g., via a wireline, downhole NMR probe, etc.), for example, to acquire data as to nuclear magnetic properties of elements in a formation (e.g., hydrogen, carbon, phosphorous, etc.).

As an example, lithology scanning technology may be employed to acquire and analyze data. For example, consider the LITHO SCANNER technology marketed by Schlumberger Limited (Houston, Texas). As an example, a LITHO SCANNER tool may be a gamma ray spectroscopy tool.

As an example, a tool may be positioned to acquire information in a portion of a borehole. Analysis of such information may reveal vugs, dissolution planes (e.g., dissolution along bedding planes), stress-related features, dip events, etc. As an example, a tool may acquire information that may help to characterize a fractured reservoir, optionally where fractures may be natural and/or artificial (e.g., hydraulic fractures). Such information may assist with completions, stimulation treatment, etc. As an example, information acquired by a tool may be analyzed using a framework such as the aforementioned TECHLOG framework (Schlumberger Limited, Houston, Texas).

As an example, a workflow may utilize one or more types of data for one or more processes (e.g., stratigraphic modeling, basin modeling, completion designs, drilling, production, injection, etc.). As an example, one or more tools may provide data that can be used in a workflow or workflows that may implement one or more frameworks (e.g., PETREL, TECHLOG, PETROMOD, ECLIPSE, etc.).

As to the convention 240 for dip, as shown in FIG. 2, the three dimensional orientation of a plane can be defined by its dip and strike. Dip is the angle of slope of a plane from a horizontal plane (e.g., an imaginary plane) measured in a vertical plane in a specific direction. Dip may be defined by magnitude (e.g., also known as angle or amount) and azimuth (e.g., also known as direction). As shown in the convention 240 of FIG. 2, various angles φ indicate angle of slope downwards, for example, from an imaginary horizontal plane (e.g., flat upper surface); whereas, dip refers to the direction towards which a dipping plane slopes (e.g., which may be given with respect to degrees, compass directions, etc.). Another feature shown in the convention of FIG. 2 is strike, which is the orientation of the line created by the intersection of a dipping plane and a horizontal plane (e.g., consider the flat upper surface as being an imaginary horizontal plane).

Some additional terms related to dip and strike may apply to an analysis, for example, depending on circumstances, orientation of collected data, etc. One term is "true dip" (see, e.g., $Dip_T$ in the convention 240 of FIG. 2). True dip is the dip of a plane measured directly perpendicular to strike (see, e.g., line directed northwardly and labeled "strike" and angle $\alpha_{90}$) and also the maximum possible value of dip magnitude. Another term is "apparent dip" (see, e.g., $Dip_A$ in the convention 240 of FIG. 2). Apparent dip may be the dip of a plane as measured in any other direction except in the direction of true dip (see, e.g., $\varphi_A$ as $Dip_A$ for angle $\alpha$); however, it is possible that the apparent dip is equal to the true dip (see, e.g., φ as $Dip_A=Dip_T$ for angle $\alpha_{90}$ with respect to the strike). In other words, where the term apparent dip is used (e.g., in a method, analysis, algorithm, etc.), for a particular dipping plane, a value for "apparent dip" may be equivalent to the true dip of that particular dipping plane.

As shown in the convention 240 of FIG. 2, the dip of a plane as seen in a cross-section perpendicular to the strike is true dip (see, e.g., the surface with φ as $Dip_A=Dip_T$ for angle $\alpha_{90}$ with respect to the strike). As indicated, dip observed in a cross-section in any other direction is apparent dip (see, e.g., surfaces labeled $Dip_A$). Further, as shown in the convention 240 of FIG. 2, apparent dip may be approximately 0 degrees (e.g., parallel to a horizontal surface where an edge of a cutting plane runs along a strike direction).

In terms of observing dip in wellbores, true dip is observed in wells drilled vertically. In wells drilled in any other orientation (or deviation), the dips observed are apparent dips (e.g., which are referred to by some as relative dips). In order to determine true dip values for planes observed in such boreholes, as an example, a vector computation (e.g., based on the borehole deviation) may be applied to one or more apparent dip values.

As mentioned, another term that finds use in sedimentological interpretations from borehole images is "relative dip" (e.g., $Dip_R$). A value of true dip measured from borehole images in rocks deposited in very calm environments may be subtracted (e.g., using vector-subtraction) from dips in a sand body. In such an example, the resulting dips are called relative dips and may find use in interpreting sand body orientation.

A convention such as the convention 240 may be used with respect to an analysis, an interpretation, an attribute, etc. As an example, various types of features may be described, in part, by dip (e.g., sedimentary bedding, faults and fractures, cuestas, igneous dikes and sills, metamorphic foliation, etc.). As an example, dip may change spatially as a layer approaches a geobody. For example, consider a salt body that may rise due to various forces (e.g., buoyancy, etc.). In such an example, dip may trend upward as a salt body moves upward.

Seismic interpretation may aim to identify and/or classify one or more subsurface boundaries based at least in part on one or more dip parameters (e.g., angle or magnitude, azimuth, etc.). As an example, various types of features (e.g., sedimentary bedding, faults and fractures, cuestas, igneous dikes and sills, metamorphic foliation, etc.) may be described at least in part by angle, at least in part by azimuth, etc.

As an example, equations may be provided for petroleum expulsion and migration, which may be modeled and simulated, for example, with respect to a period of time. Petroleum migration from a source material (e.g., primary migration or expulsion) may include use of a saturation model where migration-saturation values control expulsion. Determinations as to secondary migration of petroleum (e.g., oil or gas), may include using hydrodynamic potential of fluid and accounting for driving forces that promote fluid flow. Such forces can include buoyancy gradient, pore pressure gradient, and capillary pressure gradient.

As shown in FIG. 2, the system 250 includes one or more information storage devices 252, one or more computers 254, one or more networks 260 and instructions 270. As to the one or more computers 254, each computer may include one or more processors (e.g., or processing cores) 256 and memory 258 for storing instructions, for example, consider the instructions 270 as including instructions executable by at least one of the one or more processors. As an example, a computer may include one or more network interfaces (e.g., wired or wireless), one or more graphics cards (e.g., one or more GPUs, etc.), a display interface (e.g., wired or wireless), etc. As an example, imagery such as surface imagery (e.g., satellite, geological, geophysical, etc.) may be stored, processed, communicated, etc. As an example, data may include SAR data, GPS data, etc. and may be stored, for example, in one or more of the storage devices 252. As an example, the system 250 may be local, remote or in part local and in part remote. As to remote resources, consider one or more cloud-based resources (e.g., as part of a cloud platform, etc.).

As an example, the instructions 270 may include instructions (e.g., stored in memory) executable by one or more processors to instruct the system 250 to perform various actions. As an example, the system 250 may be configured such that the instructions 270 provide for establishing one or more aspects of the workspace framework 110 of FIG. 1. As an example, one or more methods, techniques, etc. may be performed at least in part via instructions, which may be, for example, instructions of the instructions 270 of FIG. 2.

As an example, a framework can include various components. For example, a framework can include one or more components for prediction of reservoir performance, one or more components for optimization of an operation or operations, one or more components for control of production engineering operations, etc. As an example, a framework can include components for prediction of reservoir performance, optimization and control of production engineering operations performed at one or more reservoir wells. Such a framework may, for example, allow for implementation of various methods. For example, consider an approach that allows for a combination of physics-based and data-driven methods for modeling and forecasting a reservoir production.

Figure 3:
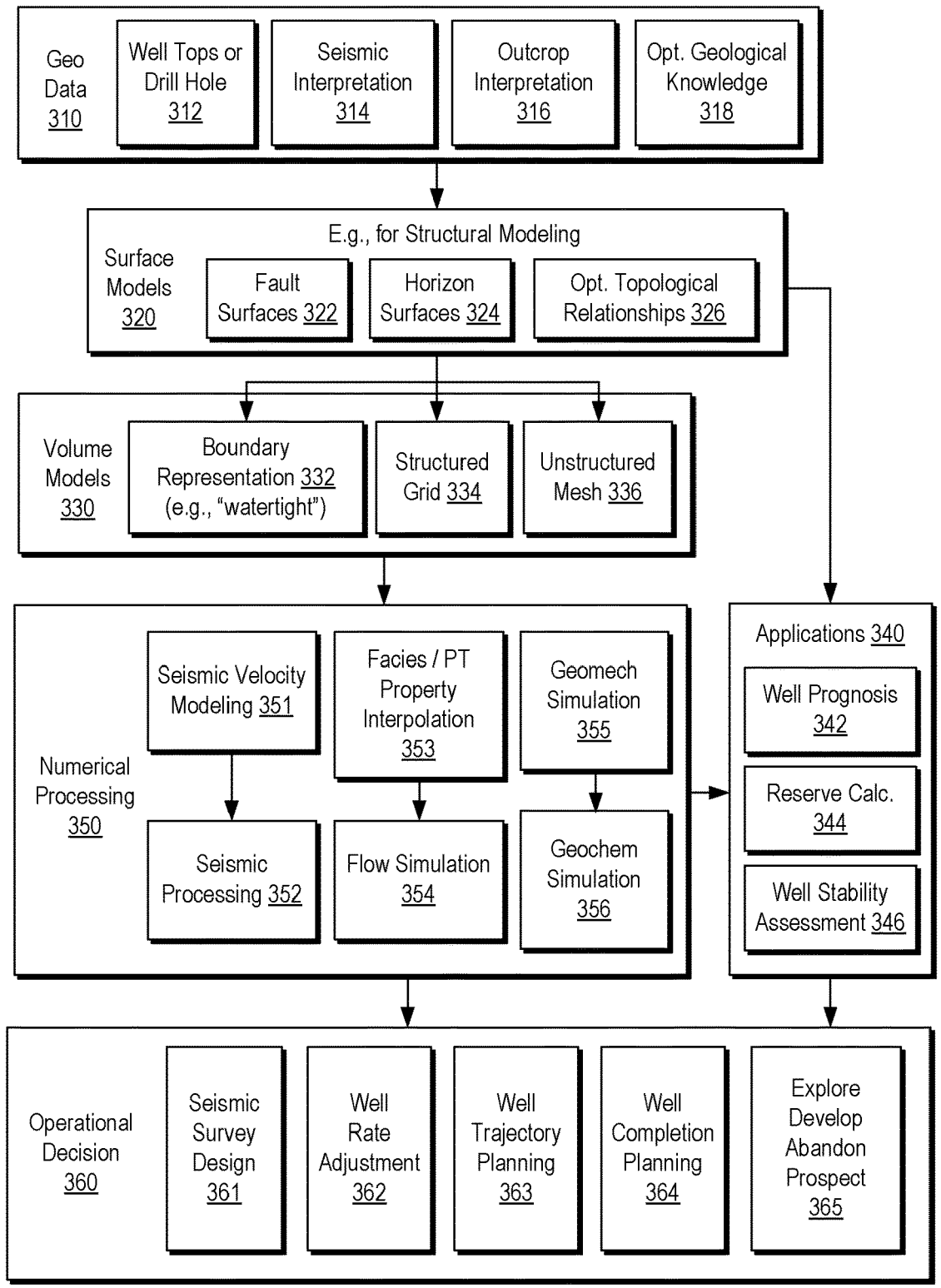
FIG. 3 illustrates an example of a system.

FIG. 3 shows an example of a system 300 that includes a geological/geophysical data block 310, a surface models block 320 (e.g., for one or more structural models), a volume models block 330, an applications block 340, a numerical processing block 350 and an operational decision block 360. As shown in the example of FIG. 3, the geological/geophysical data block 310 can include data from well tops or drill holes 312, data from seismic interpretation 314, data from outcrop interpretation and optionally data from geological knowledge. As to the surface models block 320, it may provide for creation, editing, etc. of one or more surface models based on, for example, one or more of fault surfaces 322, horizon surfaces 324 and optionally topological relationships 326. As to the volume models block 330, it may provide for creation, editing, etc. of one or more volume models based on, for example, one or more of boundary representations 332 (e.g., to form a watertight model), structured grids 334 and unstructured meshes 336.

As shown in the example of FIG. 3, the system 300 may allow for implementing one or more workflows, for example, where data of the data block 310 are used to create, edit, etc. one or more surface models of the surface models block 320, which may be used to create, edit, etc. one or more volume models of the volume models block 330. As indicated in the example of FIG. 3, the surface models block 320 may provide one or more structural models, which may be input to the applications block 340. For example, such a structural model may be provided to one or more applications, optionally without performing one or more processes of the volume models block 330 (e.g., for purposes of numerical processing by the numerical processing block 350). Accordingly, the system 300 may be suitable for one or more workflows for structural modeling (e.g., optionally without performing numerical processing per the numerical processing block 350).

As to the applications block 340, it may include applications such as a well prognosis application 342, a reserve calculation application 344 and a well stability assessment application 346. As to the numerical processing block 350, it may include a process for seismic velocity modeling 351 followed by seismic processing 352, a process for facies and petrophysical property interpolation 353 followed by flow simulation 354, and a process for geomechanical simulation 355 followed by geochemical simulation 356. As indicated, as an example, a workflow may proceed from the volume models block 330 to the numerical processing block 350 and then to the applications block 340 and/or to the operational decision block 360. As another example, a workflow may proceed from the surface models block 320 to the applications block 340 and then to the operational decisions block 360 (e.g., consider an application that operates using a structural model).

In the example of FIG. 3, the operational decisions block 360 may include a seismic survey design process 361, a well rate adjustment process 362, a well trajectory planning process 363, a well completion planning process 364 and a process for one or more prospects, for example, to decide whether to explore, develop, abandon, etc. a prospect.

Referring again to the data block 310, the well tops or drill hole data 312 may include spatial localization, and optionally surface dip, of an interface between two geological formations or of a subsurface discontinuity such as a geological fault; the seismic interpretation data 314 may include a set of points, lines or surface patches interpreted from seismic reflection data, and representing interfaces between media (e.g., geological formations in which seismic wave velocity differs) or subsurface discontinuities; the outcrop interpretation data 316 may include a set of lines or points, optionally associated with measured dip, representing boundaries between geological formations or geological faults, as interpreted on the earth surface; and the geological knowledge data 318 may include, for example knowledge of the paleo-tectonic and sedimentary evolution of a region.

As to a structural model, it may be, for example, a set of gridded or meshed surfaces representing one or more interfaces between geological formations (e.g., horizon surfaces) or mechanical discontinuities (fault surfaces) in the subsurface. As an example, a structural model may include some information about one or more topological relationships between surfaces (e.g. fault A truncates fault B, fault B intersects fault C, etc.).

As to the one or more boundary representations 332, they may include a numerical representation in which a subsurface model is partitioned into various closed units representing geological layers and fault blocks where an individual unit may be defined by its boundary and, optionally, by a set of internal boundaries such as fault surfaces.

As to the one or more structured grids 334, it may include a grid that partitions a volume of interest into different elementary volumes (cells), for example, that may be indexed according to a pre-defined, repeating pattern. As to the one or more unstructured meshes 336, it may include a mesh that partitions a volume of interest into different elementary volumes, for example, that may not be readily indexed following a pre-defined, repeating pattern (e.g., consider a Cartesian cube with indexes I, J, and K, along x, y, and z axes).

As to the seismic velocity modeling 351, it may include calculation of velocity of propagation of seismic waves (e.g., where seismic velocity depends on type of seismic wave and on direction of propagation of the wave). As to the seismic processing 352, it may include a set of processes allowing identification of localization of seismic reflectors in space, physical characteristics of the rocks in between these reflectors, etc.

As to the facies and petrophysical property interpolation 353, it may include an assessment of type of rocks and of their petrophysical properties (e.g. porosity, permeability), for example, optionally in areas not sampled by well logs or coring. As an example, such an interpolation may be constrained by interpretations from log and core data, and by prior geological knowledge.

As to the flow simulation 354, as an example, it may include simulation of flow of hydro-carbons in the subsurface, for example, through geological times (e.g., in the context of petroleum systems modeling, when trying to predict the presence and quality of oil in an un-drilled formation) or during the exploitation of a hydrocarbon reservoir (e.g., when some fluids are pumped from or into the reservoir).

As to geomechanical simulation 355, it may include simulation of the deformation of rocks under boundary conditions. Such a simulation may be used, for example, to assess compaction of a reservoir (e.g., associated with its depletion, when hydrocarbons are pumped from the porous and deformable rock that composes the reservoir). As an example a geomechanical simulation may be used for a variety of purposes such as, for example, prediction of fracturing, reconstruction of the paleo-geometries of the reservoir as they were prior to tectonic deformations, etc.

As to geochemical simulation 356, such a simulation may simulate evolution of hydrocarbon formation and composition through geological history (e.g., to assess the likelihood of oil accumulation in a particular subterranean formation while exploring new prospects).

As to the various applications of the applications block 340, the well prognosis application 342 may include predicting type and characteristics of geological formations that may be encountered by a drill-bit, and location where such rocks may be encountered (e.g., before a well is drilled); the reserve calculations application 344 may include assessing total amount of hydrocarbons or ore material present in a subsurface environment (e.g., and estimates of which proportion can be recovered, given a set of economic and technical constraints); and the well stability assessment application 346 may include estimating risk that a well, already drilled or to-be-drilled, will collapse or be damaged due underground stress.

As to the operational decision block 360, the seismic survey design process 361 may include deciding where to place seismic sources and receivers to optimize the coverage and quality of the collected seismic information while minimizing cost of acquisition; the well rate adjustment process 362 may include controlling injection and production well schedules and rates (e.g., to maximize recovery and production); the well trajectory planning process 363 may include designing a well trajectory to maximize potential recovery and production while minimizing drilling risks and costs; the well completion planning process 364 may include selecting proper well tubing, casing and completion (e.g., to meet expected production or injection targets in specified reservoir formations); and the prospect process 365 may include decision making, in an exploration context, to continue exploring, start producing or abandon prospects (e.g., based on an integrated assessment of technical and financial risks against expected benefits).

Figure 4:
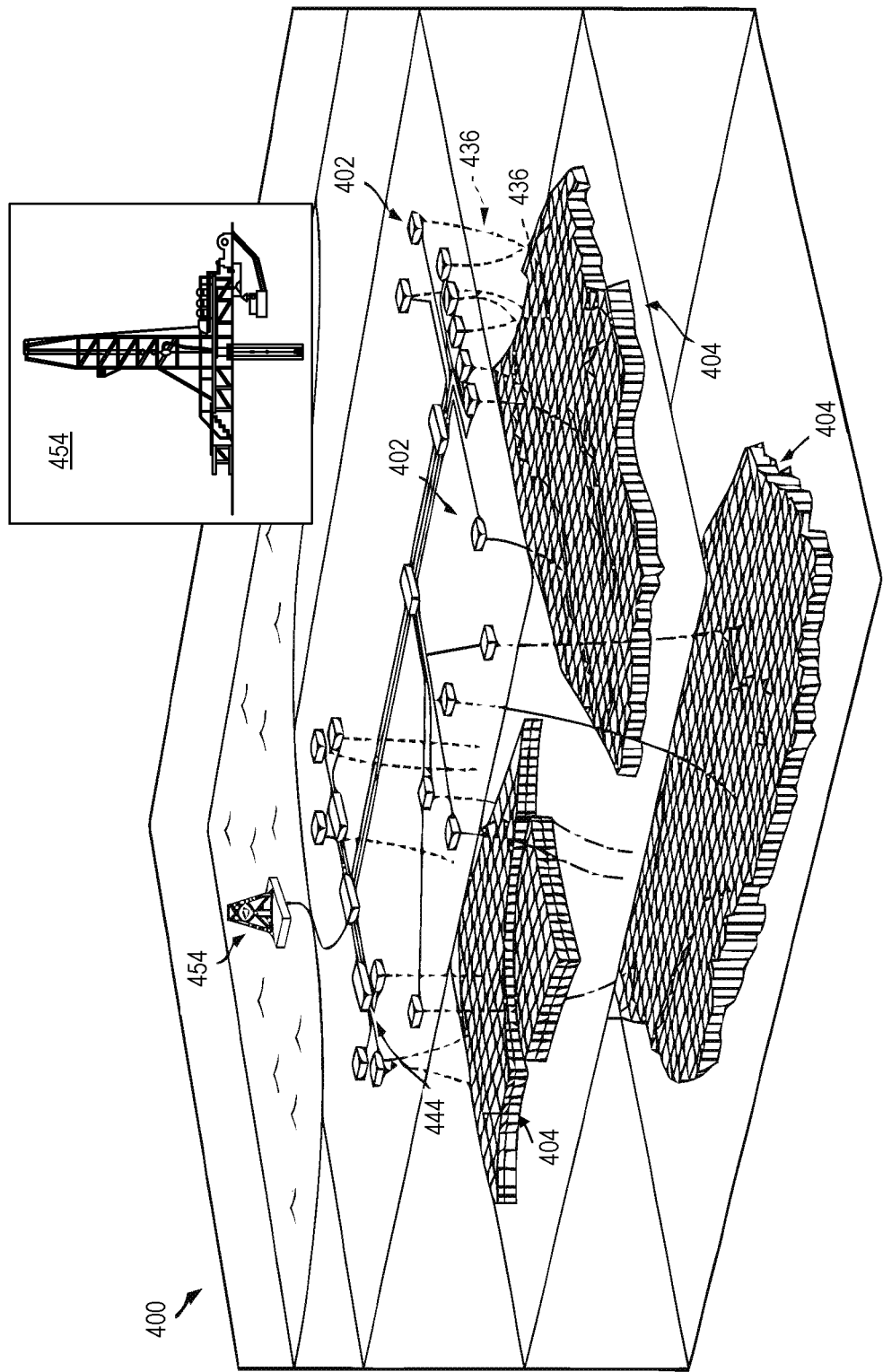
FIG. 4 illustrates examples of systems.

FIG. 4 shows an example of a geologic environment 400 as including various types of equipment and features. As shown, the geologic environment 400 includes a plurality of wellsites 402, which may be operatively connected to a processing facility. In the example of FIG. 4, individual wellsites 402 can include equipment that can form individual wellbores 436. Such wellbores can extend through subterranean formations including one or more reservoirs 404. Such reservoirs 404 can include fluids, such as hydrocarbons. As an example, wellsites can draw fluid from one or more reservoirs and pass them to one or more processing facilities via one or more surface networks 444. As an example, a surface network can include tubing and control mechanisms for controlling flow of fluids from a wellsite to a processing facility. In the example of FIG. 4, a rig 454 is shown, which may be an offshore rig or an onshore rig. As an example, a rig can be utilized to drill a borehole that can be completed to be a wellbore where the wellbore can be in fluid communication with a reservoir such that fluid may be produced from the reservoir.

As an example, a system can create and utilize a continuous solution space (CSS) for various search-based solutions where, for example, an artificial intelligence (AI) workflow can be driven manually, semi-automatically and/or automatically by one or more field development individuals and/or machine input to select one or more scenarios for field development and planning from the continuous solution space.

As an example, consider an artificial Intelligence (AI) workflow driven by domain experts to provide an AI framework with "thinking" akin to that of highly experienced development individuals. Such a workflow can provide, for example, heuristic guidance to collect suitable insights from historical data and provide, for example, evaluation of multiple development scenarios to find one or more options with a relatively high likelihood of being relevant to expedite one or more types of tasks (e.g., human, machine, etc.). Such a workflow can provide for combining domain knowledge of various less experienced development managers with assumptions from various highly experienced development managers via AI, which can utilize one or more types of techniques, technologies, etc.

As an example, a system can include a scenario recommendation engine (SRE) as part of a computational framework (e.g., an AI framework), which can be utilized in one or more types of machine learning workflows, for example, to facilitate selection of suitable scenarios via a range of decisions and decision choices. As an example, a SRE may operate in combination with a continuous solution space (CSS). As an example, a SRE may be part of a computational framework such as one or more of the frameworks described with respect to FIG. 1 and/or one or more other frameworks. For example, consider a SRE as being part of or operatively coupled to the DELFI environment for purposes of exploration, production, etc.

As an example, a SRE may be built using one or more machine learning (ML) models where, for example, one or more agents perform perception and action-based tasks to find suitable scenarios from a group of possible scenarios. In such an example, the SRE may be executable to provide results within a relatively limited amount of time that, depending on compute and memory resources, may be within a few hours or less. As an example, a workflow may implement an evaluation engine that can provide feedback to one or more AI agents, for example, to explore possibilities within a group and find and/or rank suitable members of the group.

As an example, a system can include one or more AI components that may utilize a technology such as, for example, an autoencoder as a trainable machine learning model (ML model) that can generate a trained ML model.

As an example, an end to end workflow may be created using one or more artificial intelligence (AI) algorithms combined with one or more software development techniques. In such an example, the workflow may aim to find one or more analogues for new field data (e.g., a new prospect, etc.). An analogue can be utilized, for example, in reservoir characterization (e.g., field characterization, etc.) where an analogue serves as a suitable example or proxy. In oil and gas exploration, geoscientists and engineers can perform workflows that involve comparing new prospects and fields with fields and surface exposures thought to be similar in depositional environment and reservoir character to guide predictions.

As an example, a system can include various components, which may be described with respect to an example workflow. For example, consider a workflow that includes utilization of a database, utilization of an artificial intelligence (AI) workflow, utilization of analysis and visualization components and utilization of a user consumption component. In such an example, the database can be a dynamic database where the information related to historical and producing fields can be updated according to one or more bases (e.g., continuous, periodic, etc.).

As an example, an AI component can utilize variables selected by one or more development managers and/or a machine from a database where the AI component may utilize a ML model and, for example, a similarity ranking algorithm to rank fields as available via the database based on similarity to a field of interest using selected variables. In such an example, an analysis and visualization component can facilitate performance of one or more types of analyses on the ranked similar fields (e.g., analogues, etc.), which may involve assessment of one or more economic indicators, equipment availability indicators, drilling related concerns, timing indicators, geographic location indicators, etc., where, for example, decisions (e.g., control and/or other) may be derived from one or more of the ranked fields (e.g., ranked analogues, etc.).

As an example, a user consumption component can help one or more users to preprocess one or more selected variables to a format or formats suitable for utilization by an AI component or components. As indicated, a user or machine can instruct an AI component to find and/or rank analogues where an analysis and visualization component can be utilized to perform analysis on one or more analogues.

As to a ML model or ML models that may be utilized within one or more AI components, these may include one or more ML models that are trainable utilizing one or more hyperparameter tuning algorithms, for example, triggered when there are one or more changes in one or more databases and/or selection of one or more domain variables.

As an example, a workflow can include determining various types of parameters, which can include model hyperparameters and model parameters. A model hyperparameter can be a configuration that is external to a ML model and whose value is not estimated from data. For example, consider utilization of hyperparameters in processes that help to estimate model parameters, which may be specified by an individual and/or otherwise tuned, optimized, etc. (e.g., using heuristics, etc.). As to some examples of hyperparameters, consider learning rate for training a neural network (NN), C and sigma hyperparameters for support vector machines (SVMs), k in k-nearest neighbors (KNN), etc. As to model parameters, consider examples such as weights in an artificial neural network (ANN), support vectors in a support vector machine (SVM), coefficients in a linear regression or logistic regression, etc.

As an example, various components of a system can be connected using one or more of various engineering techniques to provide user experiences to users (e.g., human and/or machine). As an example, a component may be extensible, flexible, instantiable, etc. (e.g., modified, used separately, and/or additional components added to a workflow, etc.).

As explained, field development planning can be a relatively complex process that includes evaluating multiple scenarios for a field and selecting a suitable scenario based on assessing tradeoffs among numerous factors. Developing field development plans for a field in a complex environment can be, at times, difficult to formulate and execute. Such development plans can be formulated, validated and executed by highly experienced field development planning experts. For example, consider a team approach where a team determines the selected options utilizing human involvement, which pose a risk of missing a highly efficient development scenario (option), particularly where a team can be of lesser experienced compared to an advanced team.

An experienced domain expert can generally develop a more efficient development plan (e.g., more successful in securing investment in resources, etc.) using an ability to make good assumptions based on long career/domain experience. For example, an expert may derive multiple options by considering: geography, terrain/bathymetry, nearby infrastructure, access to markets, quality of produced gas/oil, commercial considerations, appetite for risk (e.g., technical, commercial, etc.), security and geopolitics, etc. Such considerations can be augmented by consideration of historic projects, well planning and design software, modelling and simulation frameworks and industry-leading reservoir characterization, drilling, completion and stimulation technologies. An expert or expert team can consolidate such information in an effort to uncover the very best alternatives, which may be difficult to discern or uncover by an individual or team with lesser expertise. As may be appreciated, there is a limited, and diminishing, group of experts available. For example, experts age and may retire, with or without an ability to assist, train, etc. An expert may have been involved in numerous projects spanning decades, along with innovations in technology, some failed and some successful, etc.

Various entities in the oil and gas industry may have access to a relatively large volume of data, which can include data of historical and ongoing developments. As an example, various ML algorithms may be implemented to obtain insights from historical data. For example, agents developed using ML algorithms can perform tasks to learn patterns in data and form a generalized hypothesis from the data.

As an example, consider various tasks such as: perception-based tasks performed using a static database such as regression, classification, representation learning etc.; and action-based tasks performed inside a dynamic environment such as reinforcement learning where an agent has feedback from the environment and can alter the state of the environment based on its actions. In various examples, machine learning algorithms can learn using structured data and/or unstructured data.

As explained with respect to the system 100 of FIG. 1, various technologies can include those for well planning and design, modelling and simulation, reservoir characterization, drilling, completion and stimulation technologies, risk management frameworks, etc. As an example, data can include data in the public domain, proprietary data, client data, data allowed to use legally such as past surveys of fields, well logs, field development reports, etc. As an example, a field development plan framework (FDPlan) may be implemented in a manner in which a common, shared environment is available in which multi-disciplinary teams can work collaboratively to deliver an integrated, high-quality field development plan.

Figure 5:
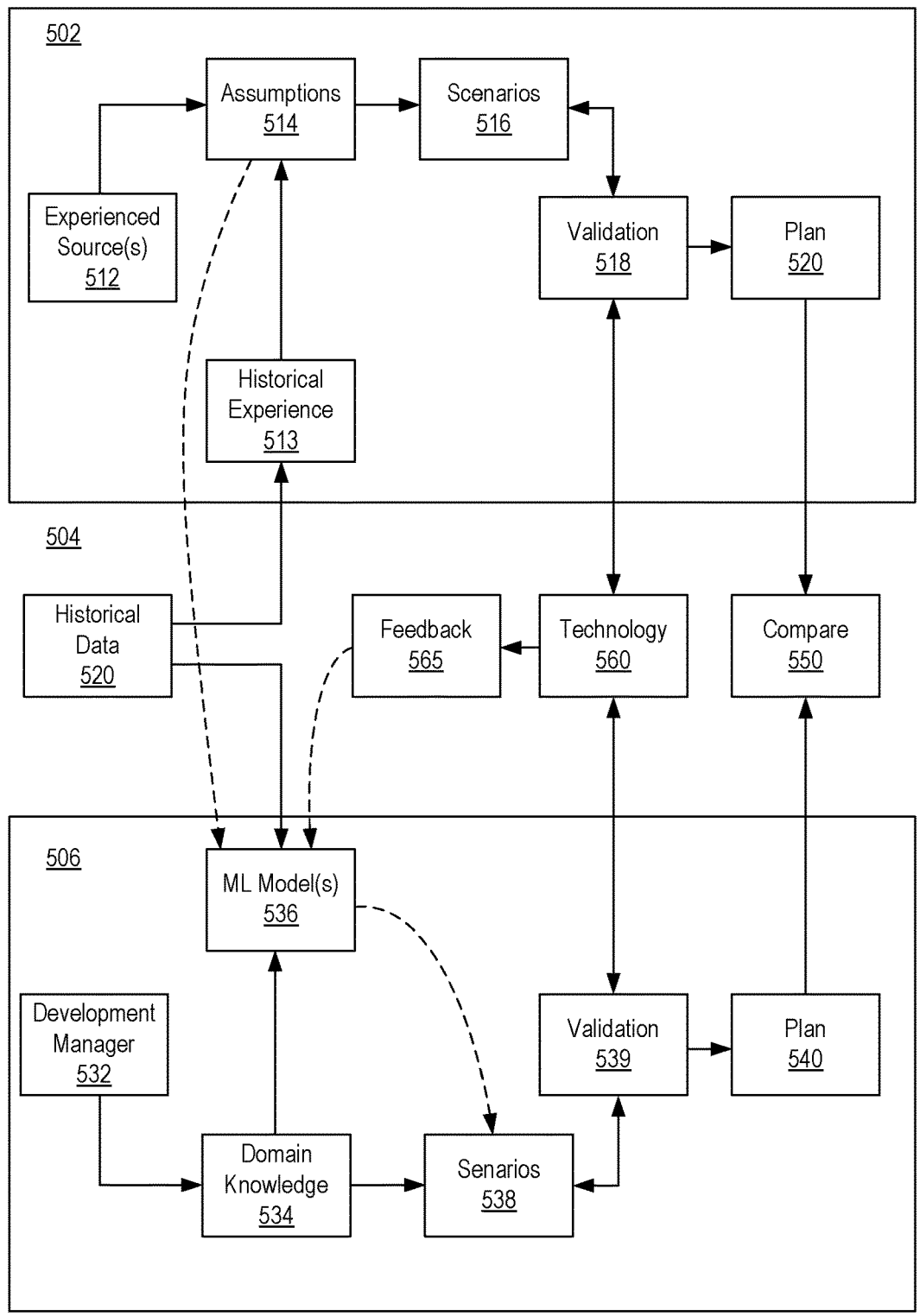
FIG. 5 illustrates an example of a system.

FIG. 5 shows an example of a system 500 that includes operational environments 502, 504 and 506 where the environment 504 can bridge the environments 502 and 506. As shown, the environment 502 includes an experienced source(s) block 512 that can output assumptions as indicated by an assumptions block 514, which can be at least in part based on historical experience via the historical experience block 513. As shown in a scenarios block 516, it may utilize the assumptions (e.g., as informed by historical experience) to determine one or more scenarios, which can be subjected to validation per the validation block 518, which, in turn, can output a validated plan per the plan block 520.

As to the environment 506, it includes a development manager block 532 that can be a user interface (e.g., a graphical user interface (GUI), etc.) for interactions for purposes of plan development. As shown, the block 532 can be utilized to inform a domain knowledge block 534, which can output information to a ML model(s) block 536 and a scenarios block 538, which, as shown by a dashed line, can be informed via the ML model(s) block 536. As indicated, one or more scenarios may be subjected to validation per a validation block 539, which can output a suitable plan per the plan block 540.

As to the environment 504, as mentioned, it can operatively couple the environments 502 and 506. For example, a historical data block 520 can inform the historical experience block 513 and the ML model(s) block 536, which may also receive information such as feedback per a feedback block 565. For example, consider the validation blocks 518 and 539 as being operatively coupled via a technology block 560 that may provide access to one or more workflows, frameworks, etc. (see, e.g., the system 100 of FIG. 1, etc.). For example, consider a simulation framework that can include scenario information as part of a validation process where simulation can provide simulation results that can aid in validation and/or updating. For example, where a scenario is subjected to simulation, the simulation may indicate that one or more issues exist that can be characterized as feedback that can inform the ML model(s) block 536 in an effort to generate one or more updated scenarios per the scenarios block 538. In such an example, a loop can exist that can act to improve the scenarios and hence ability to validate to generate a suitable plan per the plan block 540.

As an example, as to the block 560, input from the environment 506 may be utilized by one or more frameworks for generating initial conditions, an initial case, etc. For example, consider a simulator that can be started with initial conditions based on output of the environment 506. In such an example, the simulator may operate with lesser risk of non-convergence and with an increase chance of converging to a physically meaningful solution. In such an example, simulation results may be assessed, for example, to provide feedback, etc. For example, consider a decision to have X number of wells to be constructed using Y number of rigs. In such an example, a framework such as the ECLIPSE framework may be utilized for simulating physical phenomena as to X number of wells in fluid communication with a reservoir (see, e.g., FIG. 4). In such an example, results from a simulation may be utilized in a feedback approach for tuning such that a refined plan can be generated. In such an example, a scenario may help to initialize a simulation such that risk of non-convergence is reduced (e.g., an initial condition/conditions being closer to reality, etc., as may be informed using historical data, etc.).

In the example of FIG. 5, a check may occur between a plan of the environment 506 and a plan of the environment 502 per a comparison block 550 of the environment 504. In such an example, the comparison block 550 may provide a final check or sanity check to assure that a plan output by the plan block 540 is suitable for subsequent action (e.g., field development, equipment control, etc.). As an example, results of the comparison block 550 may also be provided as feedback of the block 565, for example, to form a loop that aims to improve plan generation. For example, a plan of the plan block 540 may be a plan that is tailored to specifics of a field of interest (e.g., a prospect, etc.) where a comparison can help assure that such tailoring is rational and/or otherwise practical where, if not, further revision(s) may be made.

As explained with respect to the example of FIG. 5, the environment 502 can provide for growing a field via highly experienced development managers. As explained, such a process can be utilized to inform one or more other processes such as one or more of those of the environment 506, via the environment 504. For example, the environment 506 can be driven directly and/or indirectly by assumptions, domain knowledge of other development managers and AI with feedback from existing technology.

In the example of FIG. 5, dashed lines highlight some examples of processes that may be driven by a development manager and his/her team with suitable, acceptable domain knowledge. In the environment 502, highly experienced development managers know historical field developments very well from their experience. They make some assumptions based on various factors where they can consider analogues from historical field developments to determine which options may be acceptable. They may evaluate several scenarios based on these assumptions that can then be validated, which may be via one or more technologies (e.g., planning and design frameworks, modelling and simulation frameworks, reservoir characterization, drilling, completion and stimulation technologies, etc. As an example, a hierarchical approach can include filtering or honing, for example, after evaluation and validation of scenarios, a number of top performing scenarios can be screened, investigated further and eventually a best option may be selected.

In the example of FIG. 5, as explained, an AI workflow can be driven by information from field development experts for selecting acceptable scenarios for field development and planning from a continuous solution space (CSS).

The system 500 of FIG. 5 can achieve comparable results in the environment 506 using domain knowledge of development managers and AI as built using available data from historical/ongoing developments with feedback from various technologies. The environment 504 helps to bridge environments such that the environment 506 can proceed with lesser individual and/or team expertise. Such an approach provides an ability to look into a number of possible scenarios such that risk of missing a best option is reduced. As explained, machine learning workflows can be driven by one or more development managers. As explained, one or more ML model approaches can perform various tasks, which can include perception-based tasks and action-based tasks. For example, a perception-based task may be performed using one or more ML models trained using one or more static and/or dynamic database, for example, using one or more of regression, classification, clustering, representation learning, etc.

As an example, a system can include an analogue engine that allows for finding analogues within a historical database using user-specified attributes. In such an example, the analogue engine may provide for ranking of analogues according to one or more criteria, which may be selectable, adjustable, etc. As an example, various components may allow for performance of perception-based tasks, for example, to predict or forecast variables, properties or economic indicators from historical database data. As an example, data can be preprocessed based on assumptions of experienced professionals to train one or more ML models. Action-based tasks are performed by AI agents in an available dynamic environment using ML algorithms such as reinforcement learning or inverse reinforcement learning where an agent can receive feedback from an environment and can alter the state of the environment based on its actions.

As explained, a workflow can consider scenarios based on particular decisions and decision choices. As explained, a number of performing scenarios can be identified, for example, via dynamically validating such scenarios by existing technology and feedback, as may be provided back to one or more AI agents, for example, to alter decisions and decision choices.

After evaluation and validation of scenarios, a number of candidate scenarios can be screened to develop a final plan (e.g., from a ranked number of candidates, etc.). Such scenarios/plans may aim to be highly comparable and competitive to the scenarios/plans developed by highly experienced development managers.

As explained, a system can provide a shared environment in which multi-disciplinary teams work collaboratively to deliver an integrated, high-quality field development plan. As explained, various workflows can add cognitive capabilities inside a FDPlan framework through the workflow and/or its components, which may be implemented independently. The system 500 of FIG. 5 can be utilized to explore a continuous solution space (CSS), for example, for field development, which can encompass a range of possible scenarios and select a number of scenarios as output.

As an example, a FDPlan framework can be an agile field development framework that can provide planning solutions, for example, via various types of data, economics, and petrotechnical models in a live planning environment to connect and empower various disciplines involved in field development planning.

A FDPlan framework can help to reduce impacts of isolated decision-making and can help to streamline a planning process. As an example, team members can access workspaces tailored to their disciplines, connected by a set of shared business objectives to frame opportunities, build and evaluate scenarios, compare those scenarios, and output an optimal plan. As an example, scenarios can be built and evaluated from decisions and decision choices.

FIG. 6 shows an example of a solution space 610 with a recommendation engine 620 where various benchmarks 632 can exist within the solution space 610 via performance of an analogue search 634.

FIG. 6 also shows how various example decisions and choices can be organized within one or more flows where an end of a flow can result in a particular choice and where different flows may end in a common choice or different choices.

As to decisions, in the example system 600 of FIG. 6, decisions can pertain to wells, rigs, capacity, export size, reservoir section, $CO_2$ emissions, injection volume, etc.

As an example, deliverables can include one or more of decline curves, drilling constraints, facility constraints, economic framework, general capex, general operating expenditures (OPEX), well capital expenditures (CAPEX), etc., which may be prepared considering decisions and decision choices based on a field development workflow. An evaluation engine may provide economic results for various scenarios based on deliverables prepared by one or more individuals (e.g., experts, etc.). As an example, an obtained economic result may be evaluated against various performance objectives defined by a team, stakeholders, etc., which may aid in uncovering and identifying acceptable scenarios.

A process may range from selecting decisions and decision choices to creation and selection of scenarios based on performance, which may be in the realm of expert evaluation. As shown in FIG. 6, a problem with five decisions and five choices presents some amount of complexity and variation. As problems grow in size, complexity increases, which can demand increased resources, which can include a considerable amount of time, as many possible scenarios may exist based on the dimensionality of decisions and choices.

In the example of FIG. 6, the dashed lines represent an example of a possible scenario where the solid lines represent an example of a better possible scenario. To find a best scenario, a team may take a considerable amount of time, from weeks to months, which, as mentioned, can be based on the dimensionality of decisions and choices. In the example of FIG. 6, the choices of decision #1 are four in number, whereas, the choices of decision #2 are five in number. Thus, as shown, stacked decisions can present considerable complexity.

As an example, a system can provide for a study of a field with multiple decisions and multiple choices, where there can be multiple possible scenarios and where a few of those scenarios outperform others. Such a system can operate to find the "best scenarios" automatically using one or more machine learning models, which may help to reduce time and reliance on experts to find best scenarios.

FIG. 7 shows an example of a GUI 700 that includes various well (W) and rig (R) scenarios: (A) 10W+1R, (B) 10W+3R, (C) 20W+2R, (D) 50W+1R, and (E) 50W+3R. As explained, a number of rigs may be utilized to drill a number of wells. In such an example, the number of wells and number of rigs can be decisions. As an example, a range of wells can be from 10 to 50, which is 41 options, while a range of rigs can be from 1 to 3, which are three options. In such an example, a space can include a matrix with dimensions of 3 and 41 (e.g., 1, 2 or 3 rigs and 10 to 50 wells), as illustrated in FIG. 7. As shown, the examples given occupy a relatively small portion of the space (e.g., 5 spots out of 123 spots). As such, the space may be sparse (e.g., a sparse space). The five examples shown in FIG. 7 (labeled as A, B, C, D and E) can be considered initial inputs, for example, as input by a user as part of a process that utilizes a scenario recommendation engine (SRE).

As to performance metrics, in the example of FIG. 7, radar charts (spider plots, etc.) are shown for each of the inputs with axes for ATNPV (after-tax net present value as a current worth of a flow of income after taxes), Net Cumulative Oil, Total CAPEX (capital expenditure), UDC (unit development cost) and Net Cumulative BOE (barrel of oil equivalent). As shown, each of the charts can generate an area, which can have a shape. In FIG. 7, each of the shapes is present in an appropriate box of the matrix or solution space, which, as mentioned, includes 123 possible combinations of well number (10 to 50) and rig number (1, 2 or 3).

As explained, a SRE may be built using one or more ML algorithms where, for example, one or more agents can perform perception and/or action-based tasks to find suitable scenarios from possible scenarios within an acceptable amount of time. A workflow can include using an evaluation engine that can provide feedback to an AI agent for exploration of possibilities in an effort to find those that are better than others.

As an example, a system can include an AI agent component, a dynamic dataset of scenarios and results obtained from an evaluation engine, and a recommended scenario. As an example, a workflow can include one or more actions driven by a user. For example, consider a user that defines decisions and possible decision choices associated with each decision. In such an approach, one or more users may also have the freedom to evaluate several initial scenarios based on their experience to reduce time (see, e.g., FIG. 6). As an example, a dynamic dataset can be created based on user input definitions.

As an example, a workflow can include utilizing an AI agent to create recommended scenario/scenarios using one or more ML models and the available range of decision choices and few initial scenarios and its results that may be created by users based on their experience.

As an example, a workflow can include evaluating recommended scenarios using an evaluation engine such that results are obtained. In such an example, the recommended scenarios and results can be added to a dynamic dataset of scenarios and their results. In such an example, an AI agent can provide a new recommendation based on the updated dataset and optimizing objective function which evaluates the existing results relative to the performance objectives, for example, as defined by users and/or stakeholders. Such a process may be repeated for multiple iterations or until an AI agent provides a same scenario as a recommended scenario (e.g., no change or change within some limit or limits).

Figure 8:
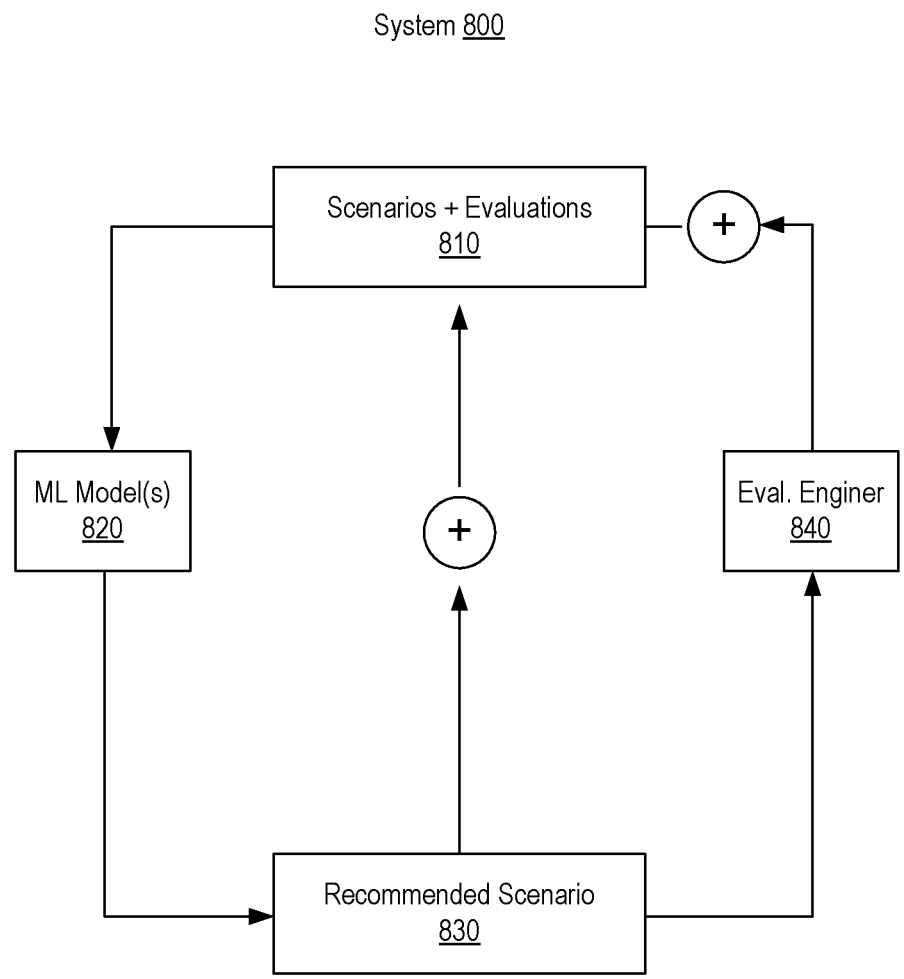
FIG. 8 illustrates an example of a system.

FIG. 8 shows an example of a system 800 and a workflow that includes a scenarios and evaluation block 810, a ML model(s) block 820, a recommended scenario block 830, and an evaluation engineer block 840. As explained, such a workflow can be an iterative workflow of a scenario recommendation engine (SRE).

A system such as the system 800 can help to reduce time and increase efficiency. For example, such a system can help one or more users to find the best scenarios automatically in vastly less time compared to a non-automated workflow where users have to spend a tremendous amount of time exploring multiple scenarios (see, e.g., FIG. 6).

As an example, the system 800 can be utilized for one or more types of workflows, where one or more users aim to find the best possible choices for a targeted objective process.

As an example, one or more AI agents can be trained, assuming an end to end process as being a stochastic processes and using a suitable algorithm that performs effectively to obtain a solution for stochastic processes. For example, consider finding the best policy for an agent using reinforcement learning.

As an example, a system can perform a workflow that aims to look into a relatively large number of possible scenarios in few hours or less rather than manually creating and evaluating such possible scenarios which may take few weeks or months.

As explained, a system can be flexible, extensible, etc., where it may improve a workflow such as a field development planning workflow. As an example, a client may login to such a system to find best scenario(s) for a study of a field of interest based on a range of decisions and its choices identified by the client's experts. In such an example, the system may provide an option for use of a client's own evaluation engine (or other third party engine) to obtain results. In such an example, integration may be via one or more application programming interfaces (APIs), plug-ins, cloud-based interactions, etc.

Figure 9:
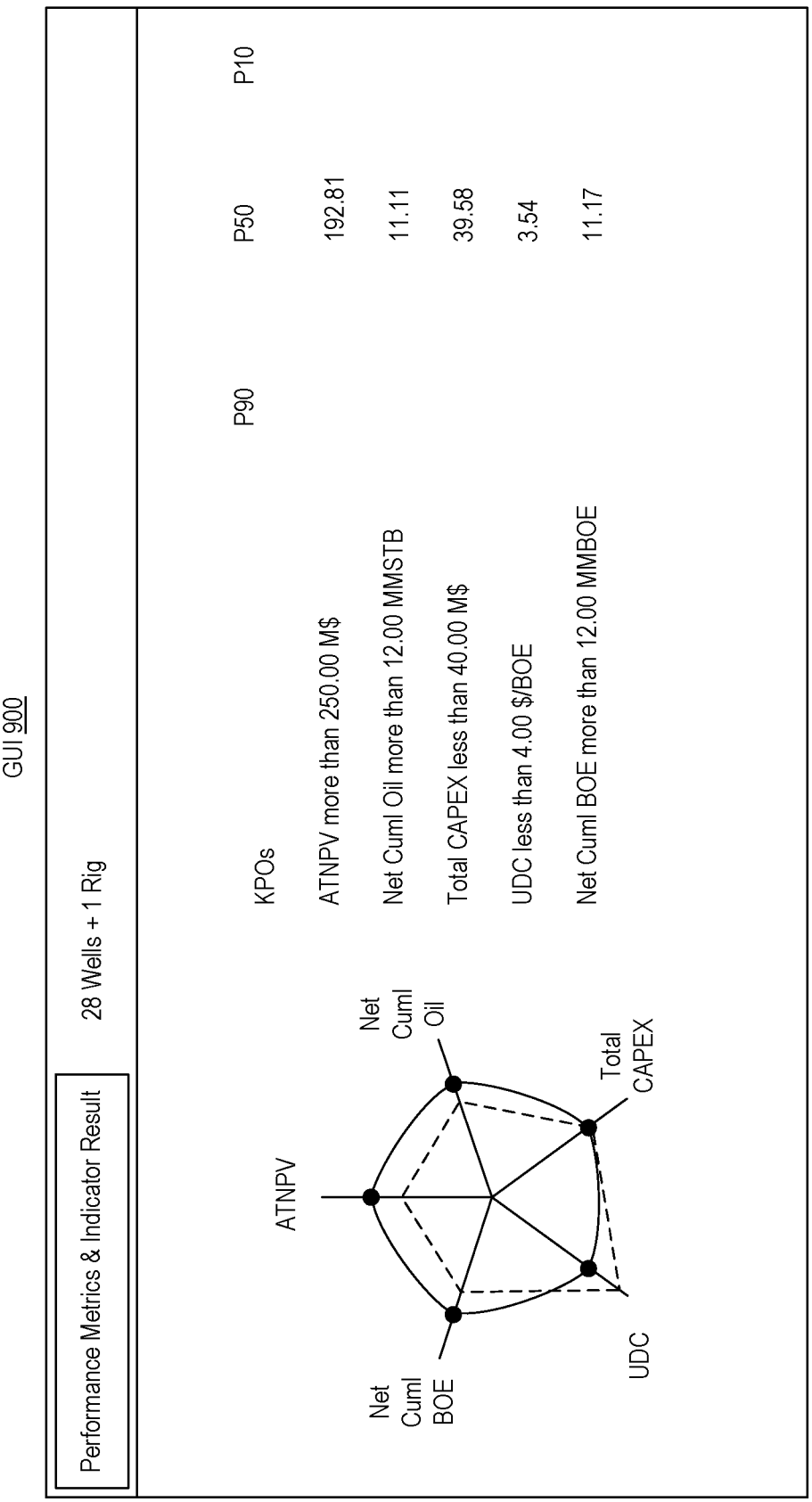
FIG. 9 illustrates an example of a graphical user interface.

FIG. 9 shows an example of a graphical user interface (GUI) 900, which can be one of a number of scenario GUIs, which may be animated such that a user can visualize a workflow as it proceeds. In the example of FIG. 9, the GUI 900 shows a radar graph for an example with 28 wells and 1 rig, where various probability information is also given for P90, P50 and/or P10. As shown, the performance metrics include those shown in FIG. 7 where each performance metric has at least a corresponding P50 value and where each of the performance metrics has a minimum or maximum criterion (e.g., more than or less than). In such an example, a process may aim to uncover a scenario that meets the stated performance metric criteria or that comes closest to meeting such criteria (e.g., in an objective manner as may be via error, etc.).

Figure 10:
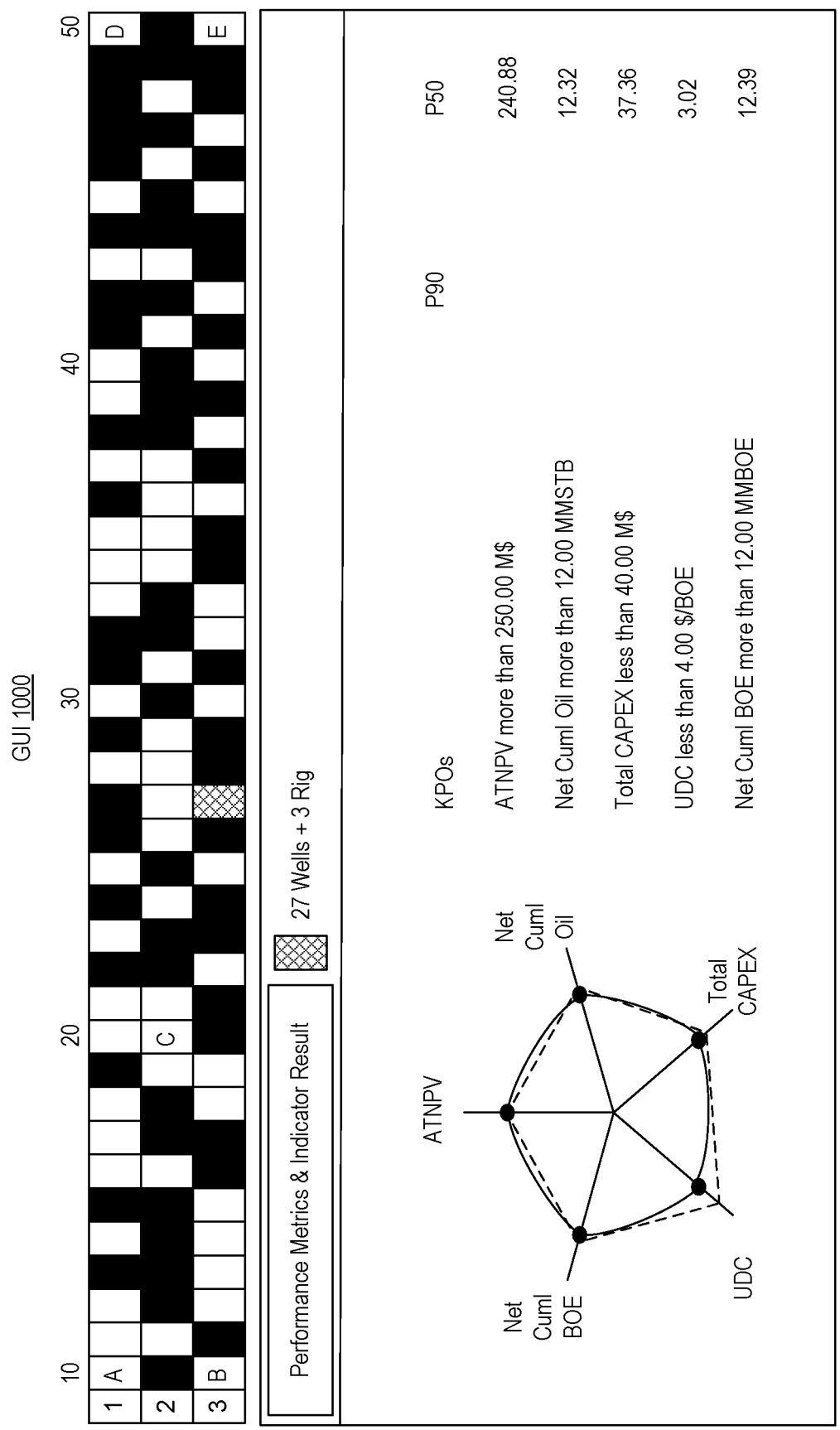
FIG. 10 illustrates an example of a graphical user interface.

FIG. 10 shows an example of a GUI 1000, which includes a matrix (e.g., solution space) with initial scenarios (e.g., A, B, C, D and E) and example scenarios (see black blocks in the matrix) where a particular scenario with 27 wells and 3 rigs has been identified (see block in the matrix with cross-hatching).

In the example of FIG. 10, machine learning can be utilized to look at many options and choose the optimum.

Below, an example portion of pseudo-code and/or code is presented:

```
# KPOs
#UDC, Total Prod, Total CAPEX, ATNPV, Total Oil
10,2
X = np.array([10,1],[10,2],[20,1],. . . , [38, 3], [27,3]])
X.shape (55, 2)
[1.66, 8.33, 13.86, 154.26, 8.2913]
Y = np.array([[1.66, 8.33, 13.86, 154.26,8.2913],[1.63, 8.48,13.83, 159.53,
8.4343],[2.84, 9.87,28.03, 176.98,9.81675], . . . , [3.71, 14.2413, 52.8862, 267.4757,
14.16256], [3.02, 12.39, 37.3607, 240.8780, 12.3228]])
Y array([[ 1.66 , 8.33 , 13.86 , 154.26, 8.2913], [1.63, 8.48 , 13.83, 159.53, 8.4343], [
2.84, 9.87, 28.03, 176.98, 9.81675], . . . , [3.71, 14.2413, 52.8862, 267.4757,
14.16256], [3.02, 12.39, 37.3607, 240.878, 12.3228 ]])
Y.shape (55, 5)
np.max(Y, axis=0)
array([ 5.13 , 19.94 , 82.27 , 393.3297, 19.8359])
```

```
np.min(Y, axis=0)
array([ 1.62 , 8.33 , 13.83 , 22.916 , 8.2913])
np.max(Y, axis=0)-np.min(Y, axis=0)
array([ 3.51 , 11.61 , 68.44 , 370.4137, 11.5446])
Y_norm = (Y-np.min(Y, axis=0))/(np.max(Y, axis=0)-np.min(Y, axis=0))
KPO = np.array([4, 12, 40,250,12])
KPO=KPO*[0.7, 1.3, 0.7, 1.3, 1.3]
KPO array([ 2.8, 15.6, 28. , 325. , 15.6])
KPO_norm = (KPO-np.min(Y, axis=0))/(np.max(Y, axis=0)-np.min(Y, axis=0))
KPO_norm array([ 0.33618234, 0.62618432, . . . , 0.63308387])
# LOSS = np.sum(np.square(Y_norm-KPO_norm),1)
LOSS = -1*(Y_norm[:, 0]-KPO_norm[0])+1*(Y_norm[:,1]-KPO_norm[1])-
1*(Y_norm[:,2]-KPO_norm[2])+1*(Y_norm[:,3]-KPO_norm[3])+1*(Y_norm[:,4]-
KPO_norm[4])
LOSS = LOSS.reshape(LOSS.shape[0],1)
LOSS array([[-1.18882161], [-1.14030229], . . ., [-0.98691202]])
model = GaussianProcessRegressor( )
model.fit(X,LOSS)
GaussianProcessRegressor(alpha=1e-10, copy_X_train=True, kernel=None,
n_restarts_optimizer=0, normalize_y=False,
optimizer='fmin_l_bfgs_b', random_state=None)
y_hat = model.predict(X, return_std=True)
def surrogate(model, X):
with catch_warnings( ):
simplefilter("ignore")
return model.predict(X, return_std=True)
X_samples = np.concatenate([np.random.randint(10,50, size=(100000,1)),
np.random.randint(1, 4,size=(100000,1))],1)
X_samples.shape (100000, 2)
LOSS_samples=model.predict(X_samples,return_std=True)
LOSS_samples[0].shape (100000, 1)
np.argmax(LOSS_samples[0])
X_samples[np.argmax(LOSS_samples[0]),:]
array([27, 3])
LOSS_samples[0][np.argmax(LOSS_samples[0]),0]
-0.9870389704592526
fig = plt.figure(figsize=[8,8])
ax = fig.add_subplot(111, projection='3d')
n = 100
# For each set of style and range settings, plot n random points in the box
# defined by x in [23, 32], y in [0, 100], z in [zlow, zhigh].
xs = X_samples[:,0], ys = X_samples[:,1], zs = LOSS_samples[0][:,0]
ax.scatter(xs, ys, zs, marker='o')
ax.set_xlabel('X Label'), ax.set_ylabel('Y Label'), ax.set_zlabel('Z Label')
plt.show( )
```

As indicated above, a Gaussian process regressor (GPR) is utilized, for example, via the scikit-learn framework. In the scikit-learn framework the GPR is an implementation based on Algorithm 2.1 of Gaussian Processes for Machine Learning (GPML) (C. E. Rasmussen & C. K. I. Williams, Gaussian Processes for Machine Learning, the MIT Press, 2006, ISBN 026218253X, at p. 19), which is incorporated by reference herein. In addition to standard scikit-learn estimator API, GPR: allows prediction without prior fitting (based on the GP prior); provides an additional method sample_y(X), which evaluates samples drawn from the GPR (prior or posterior) at given inputs; exposes a method log_marginal_likelihood(theta), which can be used externally for other ways of selecting hyperparameters, e.g., via Markov chain Monte Carlo.

| Algorithm 2.1 of GPML for GPR |
|---|
| input: X(inputs), y(targets), k(covariance function), $\sigma_n^2$(noise level), x*(test) |
| 2: L := cholesky(K + $\sigma_n^2$I) |
| α := $L^T$\L\y) |
| 4: f* := k*$^T$α |
| v := L\k* |
| 6: V[f*] := k(x*, x*) − $v^T$v |
| log p(y\|X) := −(1/2)$y^T$α − $\Sigma_i$ log $L_{ii}$ − (n/2)log 2π |
| 8: return: f*(mean), V[f*](variance), log p(y\|X)(log marg. likelihood) |

Algorithm 2.1 provides for predictions and log marginal likelihood for Gaussian process regression (GPR). The implementation addresses the matrix inversion required in lines 3 and 4 using Cholesky factorization in lines 5 and 6. For multiple test cases lines 4-6 can be repeated. The log determinant required in line 7 can be computed from the Cholesky factor (noting that for large n it may not be possible to represent the determinant itself). The computational complexity is $n^3/6$ for the Cholesky decomposition in line 2, and $n^2/2$ for solving triangular systems in line 3 and (for each test case) in line 5. Algorithm 2.1 uses Cholesky decomposition, instead of directly inverting the matrix, as it can be faster and numerically more stable. The algorithm returns the predictive mean and variance for noise free test data where, for example, to compute the predictive distribution for noisy test data, the algorithm can include adding the noise variance to the predictive variance.

Gaussian Processes (GP) are a generic supervised learning method designed to solve regression and probabilistic classification problems. Some example advantages of Gaussian processes are: the prediction interpolates the observations (at least for regular kernels); the prediction is probabilistic (Gaussian) so that one can compute empirical confidence intervals and decide based on those if one should refit (online fitting, adaptive fitting) the prediction in some region of interest; versatility in that different kernels can be specified (e.g., common kernels can be provided where it is also possible to specify custom kernels).

A GPR can implement one or more Gaussian processes (GP) for regression purposes. For this, the prior of the GP can be specified. The prior mean can be assumed to be constant and zero (for normalize_y=False) or the training data's mean (for normalize_y=True). The prior's covariance can be specified by passing a kernel object. The hyperparameters of the kernel can be optimized during fitting of GPR by maximizing the log-marginal-likelihood (LML) based on the passed optimizer. As the LML may have multiple local optima, the optimizer can be started repeatedly by specifying n_restarts_optimizer. As an example, a first run may be conducted starting from an initial set of hyperparameter values of a kernel; where subsequent runs can be conducted from hyperparameter values that have been chosen randomly from the range of allowed values. If the initial hyperparameters are to be kept fixed, none can be passed as optimizer.

As an example, noise level in the targets can be specified by passing it via the parameter alpha, either globally as a scalar or per datapoint. Note that a moderate noise level can also be helpful for dealing with numeric issues during fitting as it is effectively implemented as Tikhonov regularization, e.g., by adding it to the diagonal of the kernel matrix. As an example, an alternative to specifying the noise level explicitly is to include a WhiteKernel component into the kernel, which can estimate the global noise level from the data.

The form of the mean function and covariance kernel function in a GP prior may be chosen and tuned during model selection. The mean function may be constant, either zero or the mean of a training dataset. Various options exist for the covariance kernel function, which may be semi-positive definite and symmetric. Some kernel functions may include constant, linear, square exponential and Matern kernel, as well as a composition of multiple kernels. One example of a kernel is the composition of the constant kernel with the radial basis function (RBF) kernel, which encodes for smoothness of functions. Such a kernel has two hyperparameters: signal variance, $\sigma^2$, and lengthscale, l. In the scikit-learn framework, a variety of kernels are available and it is possible to specify the initial value and bounds on the hyperparameters.

As an example, an approach to tune the hyperparameters of the covariance kernel function can involve maximizing the log marginal likelihood of the training data. For example, a gradient-based optimizer may be used for efficiency; if unspecified above, a default optimizer in the scikit-learn framework is fmin_l_bfgs_b. As the log marginal likelihood is not necessarily convex, multiple restarts of the optimizer with different initializations may be used (n_restarts_optimizer).

An article by Pedregosa et al., Scikit-learn: Machine learning in python (2011), The Journal of Machine Learning Research, Volume 12, Feb. 1, 2011, pp. 2825-2830, is incorporated by reference herein.

As an example, one or more ML models may be utilized for purposes of finding, identifying and/or tailoring scenarios. For example, consider use of an autoencoder, which is a type of artificial neural network used to learn efficient data codings in an unsupervised manner. The aim of an autoencoder is to learn a representation (encoding) for a set of data, for example, for dimensionality reduction, by training the network to ignore signal "noise". Along with the reduction side, a reconstructing side is learnt, where the autoencoder tries to generate from the reduced encoding a representation as close as possible to its original input.

Example variants may aim to force the learned representations to assume useful properties. For example, consider regularized autoencoders (sparse, denoising and contractive), which are effective in learning representations for subsequent classification tasks, and variational autoencoders, with applications as generative models. Autoencoders find use in facial recognition and finding semantic meaning of words.

Figure 11:
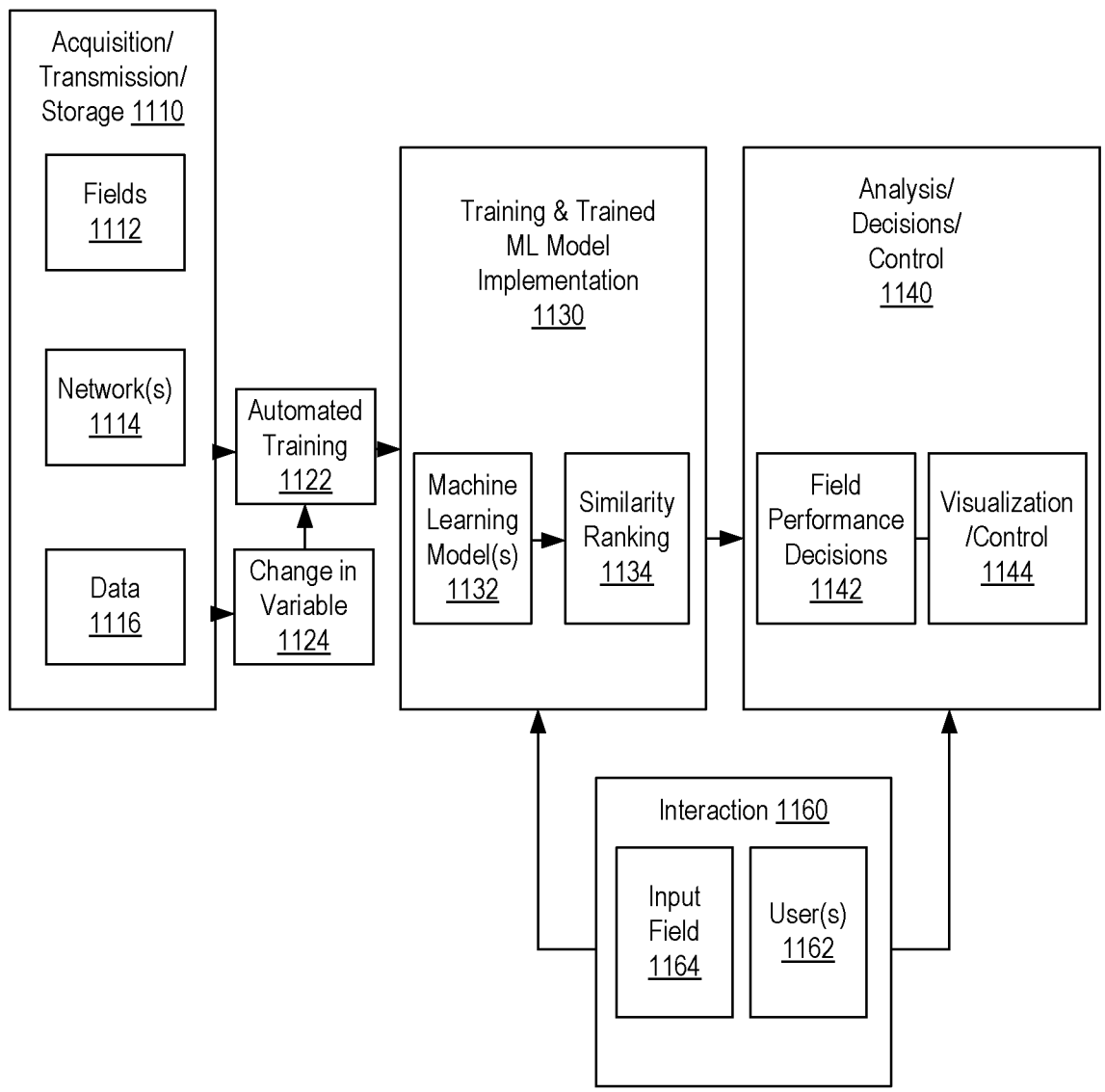
FIG. 11 illustrates an example of a system.

FIG. 11 shows an example of a system 1100 that includes an acquisition, transmission and storage block 1110, a training and trained ML model implementation block 1130 and an analysis, decisions and/or control block 1140, where, as indicated an interaction block 1160 may provide for various types of inputs and/or interactions.

As shown, the block 1110 includes fields 1112 (e.g., oil and/or gas fields, etc.), networks 1114 and data 1116. The block 1110 can be coupled to a layer that includes an automated training block 1122 and a change in variable block 1124 (e.g. a trigger block as to a change in data, a definition, a new field, etc.). As shown, the block 1130 can include one or more machine learning models 1132 that can be trained such that they can receive input (see, e.g., the block 1164) and provide output to a similarity ranking block 1134. As explained, a ML model can find candidates using input where the candidates may be output for further analysis, such as, for example, via similarity ranking against one another, against a "model", etc. For example, one or more inputs can define a field of interest that can be utilized as a model field against which one or more candidates can be compared, for example, using a technique such as similarity, etc.

As shown in the example of FIG. 11, the block 1140 can include a field performance decisions block 1142 and a visualization and/or control block 1144. For example, consider a workflow where the block 1140 receives a number of ranked candidates from the block 1130 where user interaction per the block 1160 allows for assessment, decision making and/or control. As to control, a control instruction may be issued to one or more types of equipment, which may, for example, instruct the equipment to take an action, not take an action, etc.

As to the block 1160, it includes an input field block 1164, for example, to input one or more characteristics of a field of interest and a user block 1162 for interactions by one or more users. As explained with respect to the system 500 of FIG. 5, a user may aim to generate a plan and/or to identify a plan using at least the environment 506. In such an example, the environment may include one or more features of the system 800, the system 1100, etc. For example, one or more ML models may be utilized for purposes of outputting a plan, etc.

As explained, a workflow can be an analogue workflow where an analogue is identified given particular input, which can be for a field of interest. In such an example, the workflow can be a search workflow, for example, the system 500 of FIG. 5 can be a search engine type of workflow that includes features of a search engine that can search for an analogue or analogues as a result or results based on input (e.g., a search criterion or criteria).

As explained with respect to the system 1100 of FIG. 11, a database can be included that can be updated in real-time, on a periodic basis, etc. The database can be updated for quality of analogues, which may include introducing one or more new fields, updating existing fields, etc. As an example, a database may have missing data for some of historical fields where, over time, such data may be filled in via real data, simulation data, etc.

As shown in the example of FIG. 11, a ML model can be updated automatically, which may be triggered by a change in a database or databases and/or one or more other types of data. As explained, a method can include performing representation learning using data from one or more databases.

As explained, machine learning can be supervised or unsupervised or may include a combination of both. As explained, an autoencoder may be utilized in an unsupervised manner as an unsupervised machine learning model which is trained for the purpose of learning representations of field variables from a database.

As example, an autoencoder can be neural network-based, where such an approach can provide for embeddings to be learned from a database in lower dimensions (e.g., a reduced dimensional space). As an example, embeddings can be representations in a reduced dimensional space (e.g., a latent space).

While an autoencoder is mentioned, one or more other types of models may be utilized such as, for example, one or more of variational autoencoders, generative adversarial neural networks, etc., which can be suitable to learn representations from a database into respective embeddings. Such embeddings can be used to rank fields from a database, for example, using a similarity ranking algorithm. As an example, consider cosine similarity, which compares similarity between two vectors. As an example, one or more types of vector similarity approaches may be utilized (e.g., to compare vectors).

Figure 12:
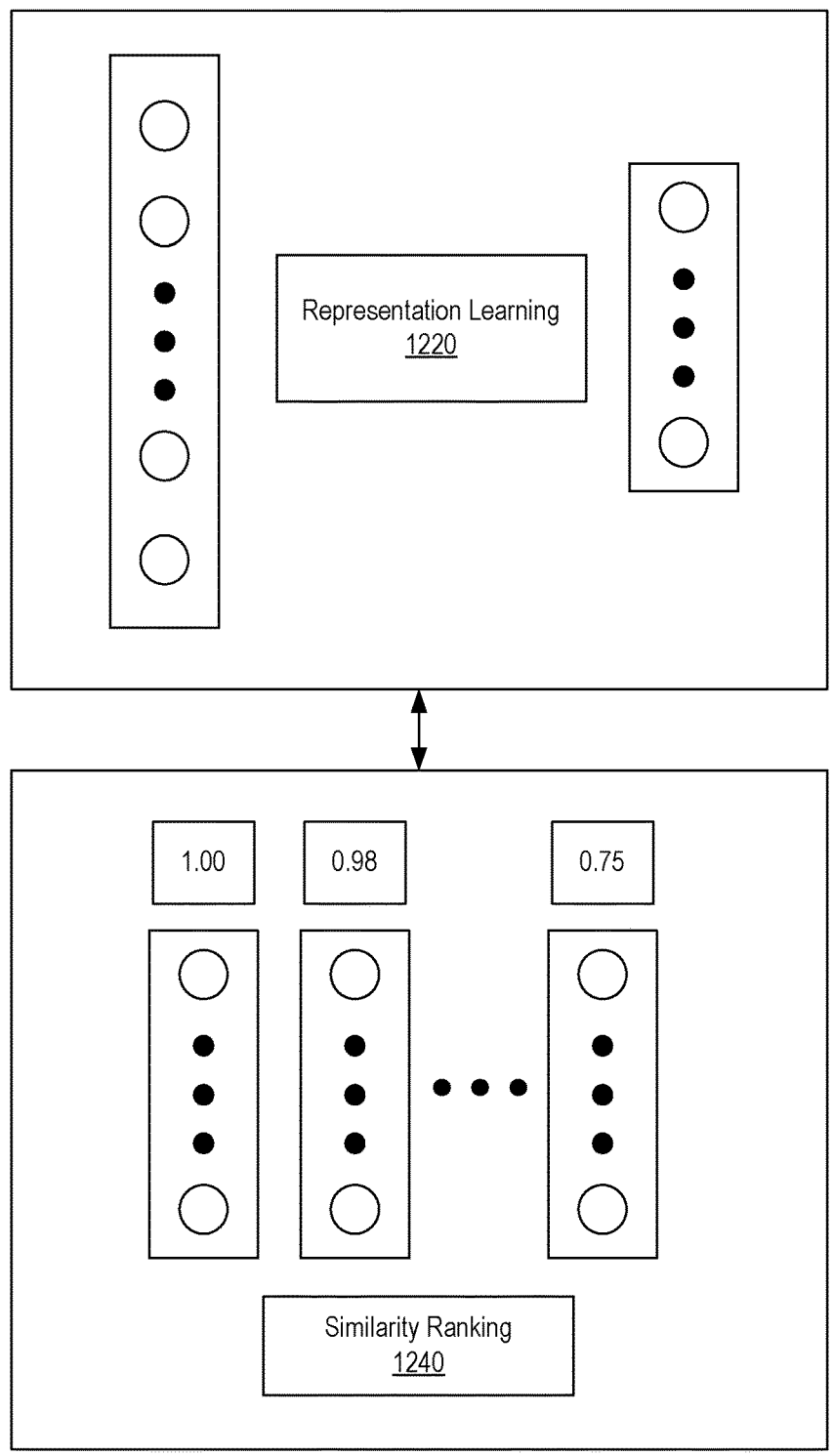
FIG. 12 illustrates an example of a system.

FIG. 12 shows an example of a system 1200 with an example of a representation learning block 1220 and an example of a similarity ranking block 1240. As explained, such techniques may be utilized in a system for performing one or more workflows. As indicated in FIG. 12, the representation learning block 1220 can reduce dimensionality (e.g., consider from over 100 to less than 100, etc.). As indicated, the similarity ranking block 1240 can compare various outputs in a reduce dimensionality (e.g., a reduced dimensionality space). In various instances, the reduce dimensionality space may be referred to as a latent space. As an example, an autoencoder or other ML model may operate as a compressor that acts to compress data of a higher dimensionality to data of a lesser dimensionality, which may capture various features of the data suitable for comparison, for example, via a similarity based approach.

FIG. 13 shows an example of training an autoencoder 1310 and an example of predicting using a trained autoencoder 1320. As shown, training of the autoencoder 1310 involves compression and decompression, or reconstruction. Training aims to make output look like input. Once trained, the compressor portion can be utilized as the trained autoencoder. As explained, a trained autoencoder can be a learned autoencoder that has learned representations and that is capable of generating data in a reduced dimensionality space. For example, consider reduction of a large vector to a smaller vector where the smaller vector may be utilized for comparisons, rankings, etc.

As shown in FIG. 13, an input to the trained autoencoder for purposes of prediction can be a prospect that may be a field of interest. As shown, the trained autoencoder can reduce that input to a lower dimensionality space that represents estimated properties such as, for example, one or more of porosity, permeability, gross thickness, net thickness, etc. As explained, output may be utilized in a ranking process that can be similarity based. For example, consider a reduced size vector that represents a field being compared to a reduced size vector of a field of interest (e.g., a prospect).

As to analysis and visualization, as explained, these may be utilized interactively. Such system features can help in selecting choices from a range of available choices of a decision for a field of interest which is under development and planning. As an example, a system can provide for processing input variables of a field of interest, like what a machine learning model can understand. As an example, a user component can preprocesses variables of a field of interest, for example, to a common scale as it is used to train a machine learning model. Such preprocessed variables may be converted into embeddings using one or more machine learning models. As an example, an analogue may be obtained from such embeddings using similarity ranking.

As an example, a workflow can be used to find similar objects such as wells from a historical database. For example, consider training an autoencoder or other ML model to search or identify wells in a historical database.

As an example, a training process can include masking and/or otherwise accounting for missing data and/or data of a quality that may be less than a data quality limit. In such an example, a training process can account for such missing and/or poor quality data.

As an example, similarity may be utilized where data may be missing and/or otherwise of poor quality. In such an example, output of a trained autoencoder can compress input to a representation such the impact of missing and/or otherwise poor quality data can be reduced. For example, consider a number of inputs being greater than 100 and a latent space being in a range from about 32 to 64 (e.g., as a vector, etc.). In such an example, the compression performed by the autoencoder can help to account for one or more types of data input issues (e.g., variation from field to field, age of field, etc.).

As to analogues, these may include features such as one or more depositional environments. A depositional environment or sedimentary environment describes the combination of physical, chemical and biological processes associated with the deposition of a particular type of sediment and, thus, rock types that can be formed after lithification, if the sediment is preserved in the rock record.

Figure 14:
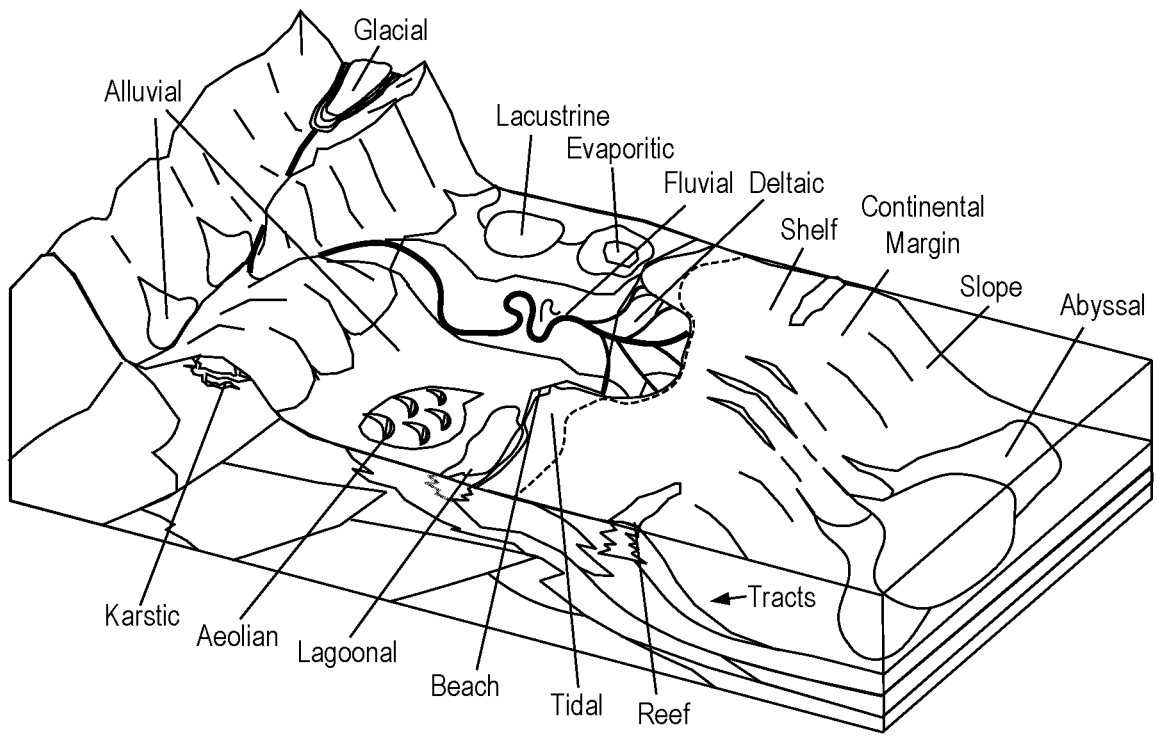
FIG. 14 illustrates an example of a diagram of some examples of depositional environments.

FIG. 14 shows a diagram of examples of various depositional environments 1400, which may be part of a GUI or GUIs, etc. A depositional environment or sedimentary environment describes the combination of physical, chemical and biological processes associated with the deposition of a particular type of sediment and, thus, rock types that can be formed after lithification, if the sediment is preserved in the rock record.

As an example, a method or methods may aim to find environments associated with particular rock types or associations of rock types to one or more existing analogues. However, the further back in geological time sediments were deposited, the more likely it may become that one or more direct modern analogues are not available.

Depositional environments may be classified using various descriptors such as, for example, continental, transitional, marine and other.

As to continental, it can include alluvial, a type of fluvial deposit, that is caused by moving water in a fan shape (e.g., alluvial fan) and containing impermeable and nonporous sediments that tend to be well sorted. Another continental type is Aeolian, which is due to wind activity. For example, wind activity can be seen in deserts and coastal regions and well sorted, large scale cross-beds. Yet another continental type is fluvial, as mentioned, due to processes associated with moving water, mainly streams, where common sediments can include gravel, sand, and silt. Another continental type lacustrine, which is also due to processes associated with moving water, mainly lakes, where common sediments can include sand, silt, and clay.

As to transitional, it can include deltaic, which is characterized by a silt deposition landform at the mouth of a river (e.g., possible cross beds, ripple marks) where common sediments can include sand, silt, and clay. Another type of transitional is tidal, due to processes associated with tidal currents, which can create tidal flats (e.g., fine-grained, ripple marks, cross-beds) where common sediments can include silt and clay. Yet another type of transitional is lagoonal, which can be associated with a shallow body of water separated from a larger body of water, for example, by barrier islands or reefs. In various instances, little transportation creates a lagoon bottom environment. Common sediments can include carbonates (e.g., in tropical climates). Another type of transitional is beach, which can be an area of loose particles at the edge of the sea or other body of water. A beach can be caused by waves and longshore currents. Processes can create beaches, spits, and sandbars with common sediments of gravel and sand. Yet another type of transitional is lake, which is a large body of relatively still water.

As to marine, a shallow water marine environment can be due to processes associated with waves and tidal currents, which can create shelves and slopes, and/or lagoons. Common sediments can include carbonates (e.g., in tropical climates) or sand, silt, and clay (e.g., non-tropical). A marine type can be an upper shoreface, which is a portion of the seafloor that is shallow enough to be agitated by everyday wave action, and another marine type can be a lower shoreface, which is a portion of the seafloor, and the sedimentary depositional environment, that lies below the everyday wave base. Yet another marine type can be a deep water marine environment, which can be a flat area on a deep ocean floor (e.g., abyssal plains) caused by ocean currents where common sediments can include clay, carbonate mud, and silica mud. Another marine type is reef, which can be a shoal of rock, sand, coral or similar material, lying beneath the surface of water caused by waves and tidal currents, which may also create one or more adjacent basins. Common reef sediments include carbonates.

As to others, consider evaporite, which is a water-soluble mineral sediment formed by evaporation from an aqueous solution and consider glacial, which can include till, which is angular to rounded grains, poorly sorted, unstratified (e.g., massive) and outwash, which can include ripple marks and/or cross-beds, similar to stream channels. Yet others include volcanic and tsunami, which is a sedimentary unit deposited by a tsunami.

Depositional environments in ancient sediments may be recognized by using a combination of one or more of sedimentary facies, facies associations, sedimentary structures and fossils, particularly trace fossil assemblages, as they can indicate the environment in which organisms lived.

As an example, a geologic environment may be characterized with respect to one or more system tracts. For example, consider a systems tract as a sequence subdivision that includes one or more depositional units that may differ in geometry from another systems tract.

As an example, different systems tracts may represent different phases of eustatic changes. Eustasy pertains to sea level and its variations. Thus, eustatic changes may pertain to sea level changes, which may result, for example, from movement of tectonic plates that alter volume of an ocean basin, from climate effects on volume of water stored in glaciers/icecaps, etc. Eustasy can affect positions of shorelines and processes of sedimentation, which can make interpretation of eustasy a useful aspect of sequence stratigraphy.

As an example, a lowstand systems tract (LST) may develop during times of relatively low sea level; a highstand systems tract (HST) may develop at times of high sea level; and a transgressive systems tract (TST) may develop at times of changing sea level.

A lowstand systems tract (LST) may be a systems tract overlying a sequence boundary (SB) and overlain by a transgressive surface (TS). A lowstand systems tract (LST) may be characterized by a progradational to aggradational parasequence set. As an example, a lowstand systems tract (LST) may be a basin-floor fan, a slope fan, a lowstand wedge, etc.

A highstand systems tract (HST) may be a systems tract bounded below by a downlap surface (DS) and above by a sequence boundary (SB). A highstand systems tract (HST) may be characterized by an aggradational to progradational parasequence set.

As an example, retrogradation may be characterized by accumulation of sequences by deposition in which beds are deposited successively landward, for example, where sediment supply may be limited and unable to fill available accommodation. For example, the position of a shoreline may migrate backward onto land, a process called transgression, during episodes of retrogradation.

As an example, aggradation may be characterized by accumulation of stratigraphic sequences by deposition that stack beds atop one another, for example, building upwards during periods of balance between sediment supply and accommodation.

As an example, progradation may be characterized by accumulation of sequences by deposition in which beds are deposited successively basinward, for example, where sediment supply exceeds accommodation. For example, the position of a shoreline may migrate into a basin during episodes of progradation (e.g., regression).

As explained, various types of depositional environments may be associated various physical processes that generated gross sediment geometric end members, which include sequences, systems tracts, and parasequences.

As an example, a database can include various types of data as may be generated during one or more stages of development of a field. For example, consider FIG. 4 where various types of wells, subsurface equipment, surface equipment, etc., may have associated data that can be stored in a database. In such an example, data may include type of bottom hole assembly (BHA), types of logs acquired, wellbore trajectory (e.g., dogleg severity, etc.), types of surface equipment, utilization of one or more artificial lift technologies, utilization of one or more stimulation techniques (e.g., fracturing, acid treatment, etc.), production curves, water flooding technology, steam assisted drainage technology, etc.

As explained, a method can include generating scenarios and making decisions automatically or semi-automatically. Such a method may be part of a framework that can be operable via one or more GUIs. As an example, a method provide for exploration of a continuous solution space (CSS) encompassing possible scenarios defined via multiple dimensions where such a method can provide for identifying suitable scenarios, for example, by analyzing scenarios and making decisions that can effectively remove scenarios that are not suitable (e.g., not workable according to one or more criteria).

As an example, a method can provide for field assessments. For example, consider a method that can provide for a field assessment involving multiple decisions and multiple choices where a relatively large number of possible scenarios exist (e.g., in a solution space, etc.) where a few of the scenarios can outperform other scenarios. As explained, such a method can provide for identifying scenarios that outperform other scenarios, which can be via implementation of one or more trained ML models. Such an approach can be expeditious and reduce time and dependence on individual with many years of experience.

In various examples, a multidimensional problem involves two dimensions such as, for example, number of wells and number of rigs. As an example, a multidimensional problem can be defined using two or more factors where a multidimensional space can provide for many possible scenarios where a trained ML model can be implemented to identify particular scenarios that can rank higher than others. As an example, in the oil and gas industry, dimensions may include one or more of wells, rigs, capacity, export size, reservoir section, $CO_2$ emissions, other emissions, injection volume, etc.

As an example, a system can provide for issuance of information for rendering one or more GUIs. For example, consider a rendering of a solution space where identified scenarios are highlighted. In such an example, a diagram such as the diagram 1400 of FIG. 14 may be utilized, for example, for purposes of defining a solutions space, scenarios, etc., and/or for purposes of identifying particular scenarios, etc. (e.g., analogues, etc.). As an example, a map may be utilized to identify locations where scenarios involve location.

FIG. 15 shows an example of a method 1500 that includes a utilization block 1510 for, responsive to receipt of input characterizing a geologic environment, utilizing a trained machine learning model to identify a number of geologic environments that include corresponding data stored in at least one database; an analysis block 1520 for analyzing one or more of the number of geologic environments; and an output block 1530 for outputting a result based at least in part on the analyzing. As explained such a result may be utilized for one or more purposes, which can include simulation, decision making, control, etc.

The method 1500 is shown in FIG. 15 in association with various computer-readable media (CRM) blocks 1511, 1521 and 1531. Such blocks generally include instructions suitable for execution by one or more processors (or processor cores) to instruct a computing device or system to perform one or more actions. While various blocks are shown, a single medium may be configured with instructions to allow for, at least in part, performance of various actions of the method 1500. As an example, a computer-readable medium (CRM) may be a computer-readable storage medium that is non-transitory and that is not a carrier wave. As an example, one or more of the blocks 1511, 1521 and 1531 may be in the form of processor-executable instructions, for example, consider the one or more sets of instructions 270 of the system 250 of FIG. 2, etc.

As an example, a system can utilize a trained ML model to assist an individual or team in generating a development plan. In such an example, various types of equipment/real-time operations may be involved where fine tuning and/or initialization of an input to a simulator and/or other framework may be enhanced.

As an example, a system can operate to understand historic data properly where, for example, a person with some knowledge can go through historical data, for example, allowing a user to hunt through the historical data to get best similar fields/plans for the user (e.g., using one or more ML models, etc.).

As an example, a database or databases can include information for at least 1000 fields such as, for example, for 24,000 fields with properties, technologies, etc. In such an example, consider a matrix that includes 24,000 rows, 104 columns (e.g., tabular dataset). As an example, a method can include similarity analysis (e.g., capturing correlations, etc.) and/or masking, which may assist with handling missing and/or poor quality data.

Machine learning (ML) can be considered an artificial intelligence technology where a computational framework can train a machine learning model (ML model) using training data to generate a trained ML model. A trained ML model may be utilized for one or more purposes. For example, consider a predictive trained ML model, a decision making trained ML model, etc.

As to types of machine learning models, consider one or more of a support vector machine (SVM) model, a k-nearest neighbors (KNN) model, an ensemble classifier model, a neural network (NN) model, etc. As an example, a machine learning model can be a deep learning model (e.g., deep Boltzmann machine, deep belief network, convolutional neural network, stacked auto-encoder, etc.), an ensemble model (e.g., random forest, gradient boosting machine, bootstrapped aggregation, AdaBoost, stacked generalization, gradient boosted regression tree, etc.), a neural network model (e.g., radial basis function network, perceptron, back-propagation, Hopfield network, etc.), a regularization model (e.g., ridge regression, least absolute shrinkage and selection operator, elastic net, least angle regression), a rule system model (e.g., cubist, one rule, zero rule, repeated incremental pruning to produce error reduction), a regression model (e.g., linear regression, ordinary least squares regression, stepwise regression, multivariate adaptive regression splines, locally estimated scatterplot smoothing, logistic regression, etc.), a Bayesian model (e.g., naïve Bayes, average on-dependence estimators, Bayesian belief network, Gaussian naïve Bayes, multinomial naïve Bayes, Bayesian network), a decision tree model (e.g., classification and regression tree, iterative dichotomiser 3, C4.5, C5.0, chi-squared automatic interaction detection, decision stump, conditional decision tree, M5), a dimensionality reduction model (e.g., principal component analysis, partial least squares regression, Sammon mapping, multidimensional scaling, projection pursuit, principal component regression, partial least squares discriminant analysis, mixture discriminant analysis, quadratic discriminant analysis, regularized discriminant analysis, flexible discriminant analysis, linear discriminant analysis, etc.), an instance model (e.g., k-nearest neighbor, learning vector quantization, self-organizing map, locally weighted learning, etc.), a clustering model (e.g., k-means, k-medians, expectation maximization, hierarchical clustering, etc.), etc.

As an example, a machine model, which may be a machine learning model, may be built using a computational framework with a library, a toolbox, etc., such as, for example, those of the MATLAB framework (MathWorks, Inc., Natick, Massachusetts). The MATLAB framework includes a toolbox that provides supervised and unsupervised machine learning algorithms, including support vector machines (SVMs), boosted and bagged decision trees, k-nearest neighbor (KNN), k-means, k-medoids, hierarchical clustering, Gaussian mixture models, and hidden Markov models. Another MATLAB framework toolbox is the Deep Learning Toolbox (DLT), which provides a framework for designing and implementing deep neural networks with algorithms, pretrained models, and apps. The DLT provides convolutional neural networks (ConvNets, CNNs) and long short-term memory (LSTM) networks to perform classification and regression on image, time-series, and text data. The DLT includes features to build network architectures such as generative adversarial networks (GANs) and Siamese networks using custom training loops, shared weights, and automatic differentiation. The DLT provides for model exchange various other frameworks.

As an example, a trained ML model (e.g., a trained ML tool that includes hardware, etc.) can be utilized for one or more tasks. As an example, various types of data may be acquired and optionally stored, which may provide for training one or more ML models, for retraining one or more ML models, for further training of one or more ML models, and/or for offline analysis, etc.

As an example, the TENSORFLOW framework (Google LLC, Mountain View, CA) may be implemented, which is an open source software library for dataflow programming that includes a symbolic math library, which can be implemented for machine learning applications that can include neural networks. As an example, the CAFFE framework may be implemented, which is a DL framework developed by Berkeley AI Research (BAIR) (University of California, Berkeley, California). As another example, consider the SCIKIT platform (e.g., scikit-learn), which utilizes the PYTHON programming language. As an example, a framework such as the APOLLO AI framework may be utilized (APOLLO.AI GmbH, Germany). As an example, a framework such as the PYTORCH framework may be utilized (Facebook AI Research Lab (FAIR), Facebook, Inc., Menlo Park, California).

As an example, a method can include, responsive to receipt of input characterizing a geologic environment, utilizing a trained machine learning model to identify a number of geologic environments that include corresponding data stored in at least one database; analyzing one or more of the number of geologic environments; and outputting a result based at least in part on the analyzing. In such an example, the result can be a field development plan applicable to the geologic environment for operations related to production of hydrocarbon fluid.

As an example, analyzing can include similarity-based ranking of at least some of a number of geologic environments.

As an example, a trained machine learning model can be or include a Gaussian process regression model. In such an example, the Gaussian process regression model can include at least one hyperparameter.

As an example, a trained machine learning model can account for performance metrics. In such an example, the trained machine learning model can account for a number of wells and a number of rigs as decision variables.

As an example, a trained machine learning model can be or include an autoencoder model. In such an example, the autoencoder model can operate to compress dimensionality of input to a lesser dimensionality space. As an example, an autoencoder model can output a vector. In such an example, a method can include analyzing that compares the vector to at least one other vector. For example, consider analyzing that includes performing cosine similarity to compare the vector to the at least one other vector.

As an example, a method can include a trained machine model that is a machine model trained using supervised learning and/or unsupervised learning.

As an example, a method can include, responsive to a change in at least one database, retraining a trained machine learning model.

As an example, a method can include executing a simulation, using a simulation framework, based at least in part on the result to generate simulation results. In such an example, such a method can include utilizing the simulation results as feedback to retrain the machine learning model and/or utilizing the simulation results as input to a trained machine learning model.

As an example, a number of geologic environments can represent scenarios where a method includes analyzing that includes validating, where a result is a validated scenario.

As an example, a result can be one of a number of geologic environments that is an analogue to input for a geologic environment.

As an example, a system can include one or more processors; memory accessible to at least one of the one or more processors; processor-executable instructions stored in the memory and executable to instruct the system to: responsive to receipt of input characterizing a geologic environment, utilize a trained machine learning model to identify a number of geologic environments that include corresponding data stored in at least one database; perform an analysis of one or more of the number of geologic environments; and output a result based at least in part on the analysis.

As an example, one or more computer-readable storage media can include processor-executable instructions to instruct a computing system to: responsive to receipt of input characterizing a geologic environment, utilize a trained machine learning model to identify a number of geologic environments that include corresponding data stored in at least one database; perform an analysis of one or more of the number of geologic environments; and output a result based at least in part on the analysis.

As an example, a computer program product can include one or more computer-readable storage media that can include processor-executable instructions to instruct a computing system to perform one or more methods and/or one or more portions of a method.

Figure 16:
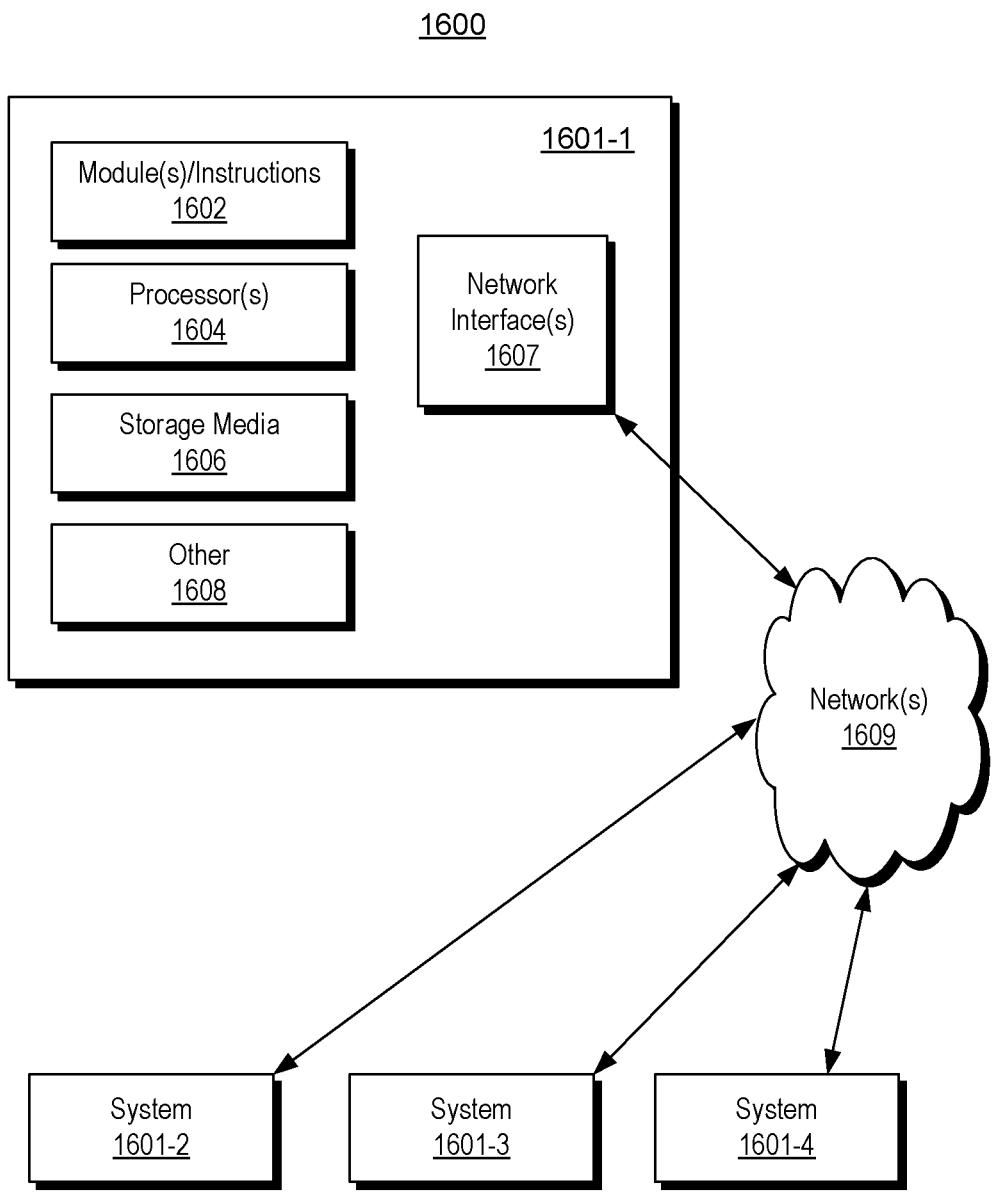
FIG. 16 illustrates examples of computer and network equipment.

In some embodiments, a method or methods may be executed by a computing system. FIG. 16 shows an example of a system 1600 that can include one or more computing systems 1601-1, 1601-2, 1601-3 and 1601-4, which may be operatively coupled via one or more networks 1609, which may include wired and/or wireless networks.

As an example, a system can include an individual computer system or an arrangement of distributed computer systems. In the example of FIG. 16, the computer system 1601-1 can include one or more modules 1602, which may be or include processor-executable instructions, for example, executable to perform various tasks (e.g., receiving information, requesting information, processing information, simulation, outputting information, etc.).

As an example, a module may be executed independently, or in coordination with, one or more processors 1604, which is (or are) operatively coupled to one or more storage media 1606 (e.g., via wire, wirelessly, etc.). As an example, one or more of the one or more processors 1604 can be operatively coupled to at least one of one or more network interface 1607. In such an example, the computer system 1601-1 can transmit and/or receive information, for example, via the one or more networks 1609 (e.g., consider one or more of the Internet, a private network, a cellular network, a satellite network, etc.).

As an example, the computer system 1601-1 may receive from and/or transmit information to one or more other devices 1608, which may be or include, for example, one or more of the computer systems 1601-2, etc. A device may be located in a physical location that differs from that of the computer system 1601-1. As an example, a location may be, for example, a processing facility location, a data center location (e.g., server farm, etc.), a rig location, a wellsite location, a downhole location, etc.

As an example, a processor may be or include a microprocessor, microcontroller, processor module or subsystem, programmable integrated circuit, programmable gate array, or another control or computing device.

As an example, the storage media 1606 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY disks, or other types of optical storage, or other types of storage devices.

As an example, a storage medium or media may be located in a machine running machine-readable instructions, or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general purpose processors or application specific chips (e.g., or chipsets), such as ASICs, FPGAs, PLDs, or other appropriate devices.

Figure 17:
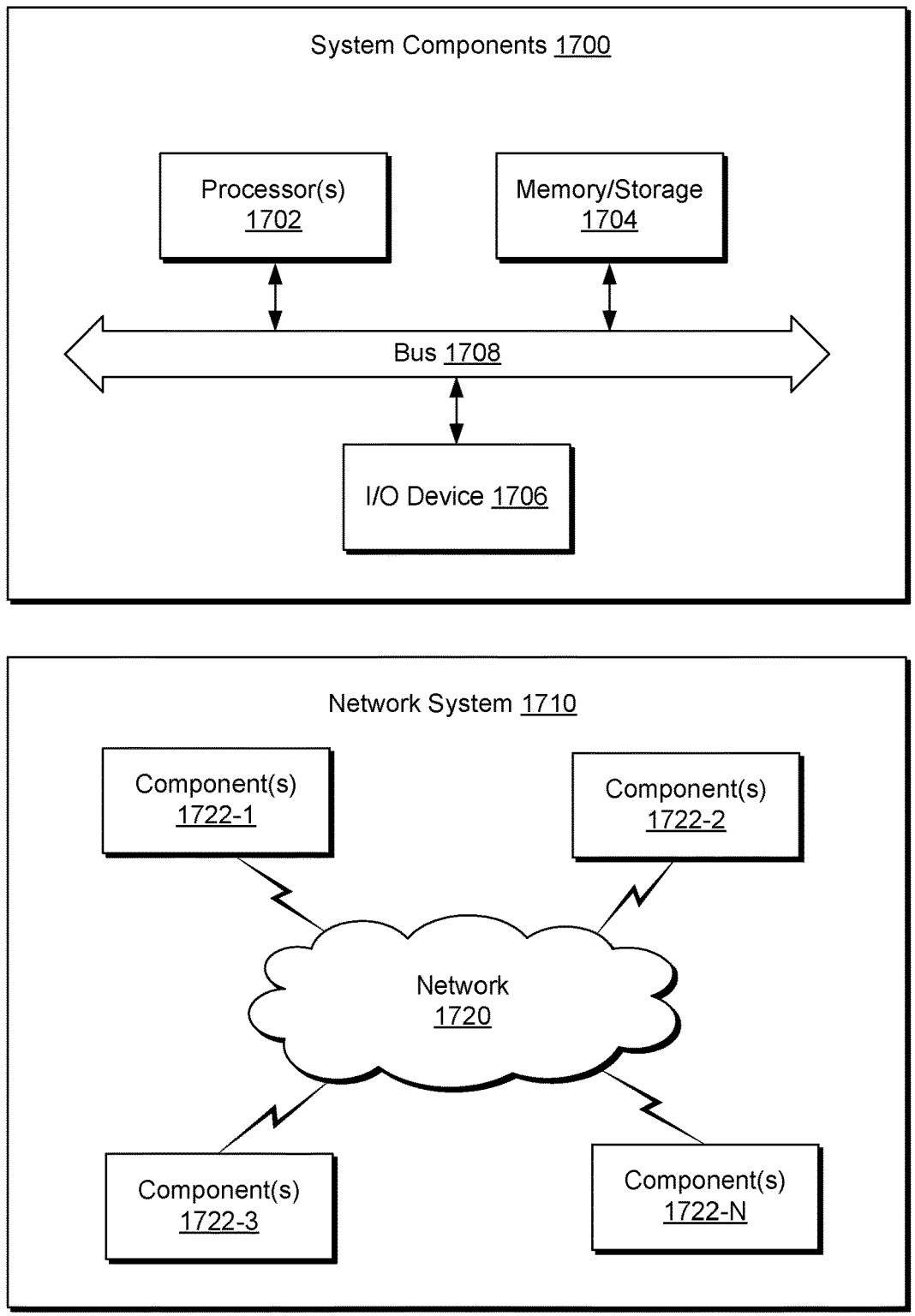
FIG. 17 illustrates example components of a system and a networked system.

FIG. 17 shows components of an example of a computing system 1700 and an example of a networked system 1710 with a network 1720. The system 1700 includes one or more processors 1702, memory and/or storage components 1704, one or more input and/or output devices 1706 and a bus 1708. In an example embodiment, instructions may be stored in one or more computer-readable media (e.g., memory/storage components 1704). Such instructions may be read by one or more processors (e.g., the processor(s) 1702) via a communication bus (e.g., the bus 1708), which may be wired or wireless. The one or more processors may execute such instructions to implement (wholly or in part) one or more attributes (e.g., as part of a method). A user may view output from and interact with a process via an I/O device (e.g., the device 1706). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 1710. The network system 1710 includes components 1722-1, 1722-2, 1722-3, . . . 1722-N. For example, the components 1722-1 may include the processor(s) 1702 while the component(s) 1722-3 may include memory accessible by the processor(s) 1702. Further, the component(s) 1722-2 may include an I/O device for display and optionally interaction with a method. A network 1720 may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

In varying circumstances, those with skill in the art may also practice the disclosed invention according to any one of the following embodiments.

In varying circumstances, those with skill in the art may also practice the disclosed invention according to the following embodiments.

In an embodiment, a method (1500) is provided, comprising: responsive to receipt of input characterizing a geologic environment, utilizing a trained machine learning model to identify a number of geologic environments that comprise corresponding data stored in at least one database (1510); analyzing one or more of the number of geologic environments (1520); and outputting a result based at least in part on the analyzing (1530).

In a further embodiment, the foregoing method (1500) includes wherein the result is a field development plan applicable to the geologic environment for operations related to production of hydrocarbon fluid.

In a further embodiment, the foregoing methods include wherein the analyzing comprises similarity-based ranking of at least some of the number of geologic environments.

In a further embodiment, the foregoing methods include wherein the trained machine learning model comprises a Gaussian process regression model.

In a further embodiment, the foregoing methods include wherein the trained machine learning model accounts for performance metrics.

In a further embodiment, the foregoing methods include wherein the autoencoder model outputs a vector and wherein the analyzing compares the vector to at least one other vector.

In a further embodiment, the foregoing methods include wherein the analyzing comprises performing cosine similarity to compare the vector to the at least one other vector.

In a further embodiment, the foregoing methods include, responsive to a change in the at least one database, retraining the trained machine learning model.

In a further embodiment, the foregoing methods include executing a simulation, using a simulation framework, based at least in part on the result to generate simulation results.

In a further embodiment, the foregoing methods include utilizing the simulation results as feedback to retrain the machine learning model or utilizing the simulation results as input to the trained machine learning model.

In a further embodiment, the foregoing methods include wherein the number of geologic environments represent scenarios and wherein the analyzing comprises validating, wherein the result comprises a validated scenario.

In a further embodiment, the foregoing methods include wherein the result is one of the number of geologic environments that is an analogue to the geologic environment.

In an embodiment, a system (250) is provided, comprising a processor (256); memory (258) operatively coupled to the processor; a network interface (260); and processor-executable instructions (270) stored in the memory to instruct the system to perform the method 1500 or any of the methods described in the foregoing further embodiments.

In an embodiment, a computer program product is provided that comprises computer-executable instructions to instruct a computing system to perform the method 1500 or any of the methods described in the foregoing further embodiments.

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method comprising:
   receiving input data characterizing a geologic environment, wherein the input data comprises one or more surface-level features indicative of one or more subterranean formations;
   responsive to receipt of the input data characterizing the geologic environment, utilizing a trained machine learning model to identify a number of geologic environments that comprise corresponding data similar to the input data and stored in at least one database;
   analyzing one or more sets of historical data representative of the number of geologic environments to determine a likelihood of a particular subterranean formation being associated with the one or more surface-level features of the geologic environment;
   outputting a result based at least in part on the analyzing, wherein the result is indicative of the particular subterranean formation associated with the one or more surface-level features of the geologic environment;
   utilizing the trained machine learning model to perform a geochemical simulation to simulate an evolution of a hydrocarbon formation and composition to obtain simulation results based at least in part on the particular subterranean formation associated with the result and the one or more sets of historical data;
   utilizing the simulation results as feedback to retrain the machine learning model, wherein the trained machine learning model includes the simulation results in the input data to the trained machine learning model;
   generating a development plan based at least in part on the result, wherein the development plan is associated with the geologic environment for operations related to production of hydrocarbon fluid; and
   controlling equipment at a wellsite based on the development plan.

2. The method of claim 1, wherein the development plan comprises a field development plan applicable to the geologic environment for the operations related to the production of hydrocarbon fluid.

3. The method of claim 1, wherein the analyzing comprises similarity-based ranking of at least some of the number of geologic environments.

4. The method of claim 1, wherein the trained machine learning model comprises a Gaussian process regression model.

5. The method of claim 1, wherein the trained machine learning model accounts for performance metrics.

6. The method of claim 1, wherein the trained machine learning model comprises an autoencoder model that operates to compress dimensionality of input to a lesser dimensionality space.

7. The method of claim 6, wherein the autoencoder model outputs a vector and wherein the analyzing compares the vector to at least one other vector.

8. The method of claim 7, wherein the analyzing comprises performing cosine similarity to compare the vector to the at least one other vector.

9. The method of claim 1, comprising, responsive to a change in the at least one database, retraining the trained machine learning model.

10. The method of claim 1, comprising utilizing the trained machine learning model to perform a flow simulation based at least in part on the result to generate additional simulation results.

11. The method of claim 10, comprising utilizing the additional simulation results as feedback to retrain the machine learning model or utilizing the additional simulation results as input to the trained machine learning model.

12. The method of claim 1, wherein the number of geologic environments represent scenarios and wherein the analyzing comprises validating a scenario of the development plan, wherein the development plan comprises a validated scenario of the development plan.

13. The method of claim 1, wherein the result is one of the number of geologic environments that is an analogue to the geologic environment.

14. The method of claim 1, wherein the one or more surface-level features are associated with a continental environment, a transitional environment, a marine environment, or any combination thereof.

15. The method of claim 1, wherein determining the likelihood of the particular subterranean formation being associated with the one or more surface-level features of the geologic environment comprises identifying a presence of one or more types of surface-level features in one or more fault features, a horizontal surface, or both of the geologic environment.

16. The method of claim 1, comprising utilizing the trained machine learning model to assign a weight to each type of surface-level feature with respect to one or more attributes of the development plan, wherein the one or more attributes include available resources, recovery viability, risk of well-collapse, or any combination thereof.

17. The method of claim 1, comprising utilizing the trained machine learning model to assign a weight to each type of surface-level feature based at least in part on a similarity between each type of surface level feature and a geological analogue associated with a presence of hydrocarbon fluid.

18. A system comprising:
one or more processors;
memory accessible to at least one of the one or more processors;
processor-executable instructions stored in the memory and executable to instruct the system to:
receive input data characterizing a geologic environment, wherein the input data comprises one or more surface-level features indicative of one or more subterranean formations;
responsive to receipt of the input data characterizing the geologic environment, utilizing a trained machine learning model to identify a number of geologic environments that comprise corresponding data similar to the input data and stored in at least one database;
perform an analysis of one or more sets of historical data representative of the number of geologic environments to determine a likelihood of a particular subterranean formation being associated with the one or more surface-level features of the geologic environment;
output a result based at least in part on the analysis, wherein the result is indicative of the particular subterranean formation associated with the one or more surface-level features of the geologic environment;
utilize the trained machine learning model to perform a geochemical simulation to simulate an evolution of a hydrocarbon formation and composition to obtain simulation results based at least in part on the particular subterranean formation associated with the result and the one or more sets of historical data;
utilize the simulation results as feedback to retrain the machine learning model, wherein the trained machine learning model includes the simulation results in the input data to the trained machine learning model;
generate a development plan based at least in part on the result, wherein the development plan is associated with the geologic environment for operations related to production of hydrocarbon fluid; and
control equipment at a wellsite based on the development plan.

19. The system of claim 18, wherein the one or more surface-level features are associated with at least one of:
a continental environment, wherein the one or more surface-level features of the continental environment include alluvial features, aeolian features, fluvial features, lacustrine features, or any combination thereof;
a transitional environment, wherein the one or more surface-level features of the transitional environment includes deltaic features, tidal features, lagoonal features, beach features, or any combination thereof; or
a marine environment, wherein the one or more surface-level features of the marine environment include upper shoreface features, lower shoreface features, deep water marine features, reef features, or any combination thereof.

20. A non-transitory computer-readable medium, comprising computer-executable instructions that, when executed, are configured to cause a processing system to perform operations comprising: receiving input data characterizing a geologic environment, wherein the input data comprises one or more surface-level features indicative of one or more subterranean formations; responsive to receipt of the input data characterizing the geologic environment, utilizing a trained machine learning model to identify a number of geologic environments that comprise corresponding data similar to the input data and stored in at least one database; analyzing one or more sets of historical data representative of the number of geologic environments to determine a likelihood of a particular subterranean formation being associated with the one or more surface-level features of the geologic environment; outputting a result based at least in part on the analyzing, wherein the result is indicative of the particular subterranean formation associated with the one or more surface-level features of the geologic environment; utilizing the trained machine learning model to perform a geochemical simulation to simulate an evolution of a hydrocarbon formation and composition to obtain simulation results based at least in part on the particular subterranean formation associated with the result and the one or more sets of historical data; utilizing the simulation results as feedback to retrain the machine learning model, wherein the trained machine learning model includes the simulation results in the input data to the trained machine learning model; generating a development plan based at least in part on the result, wherein the development plan is associated with the geologic environment for operations related to production of hydrocarbon fluid; and controlling equipment at a wellsite based on the development plan.

* * * * *